(12) United States Patent
Eguchi et al.

(10) Patent No.: US 8,253,953 B2
(45) Date of Patent: Aug. 28, 2012

(54) JOB EXECUTING DEVICE, JOB EXECUTING AND PROCESSING METHOD, AND JOB EXECUTING AND PROCESSING PROGRAM

(75) Inventors: Hiroshi Eguchi, Okazaki (JP); Kiyohito Tsujihara, Hoi-gun (JP); Hirotada Seki, Toyokawa (JP); Yuji Kobayashi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1253 days.

(21) Appl. No.: 11/790,276

(22) Filed: Apr. 24, 2007

(65) Prior Publication Data

US 2007/0253015 A1     Nov. 1, 2007

(30) Foreign Application Priority Data

May 1, 2006    (JP) ................... 2006-127934

(51) Int. Cl.
*G06F 15/00* (2006.01)
*G06K 1/00* (2006.01)
(52) U.S. Cl. ..................... 358/1.14; 358/1.15
(58) Field of Classification Search ............... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| | | | |
|---|---|---|---|
| 5,995,723 A * | 11/1999 | Sperry et al. | 358/1.15 |
| 6,369,906 B1 | 4/2002 | Nakao | |
| 6,700,678 B1 | 3/2004 | Luman | |
| 6,781,708 B1 | 8/2004 | Wada | |
| 6,906,813 B1 | 6/2005 | Tuchitoi et al. | |
| 7,603,420 B2 * | 10/2009 | Doan et al. | 709/206 |
| 2005/0264840 A1 | 12/2005 | Niitsuma | |
| 2006/0061819 A1 * | 3/2006 | Fujiwara et al. | 358/1.15 |

FOREIGN PATENT DOCUMENTS

| | | |
|---|---|---|
| JP | 2002-091917 | 3/2002 |
| JP | 2004-295225 | 10/2004 |
| JP | 2004-297680 A | 10/2004 |
| JP | 2005-018566 | 1/2005 |
| JP | 2005-212436 | 8/2005 |
| JP | 2005212436 A * | 8/2005 |
| JP | 2005-342939 | 12/2005 |
| JP | 2006-035631 A | 2/2006 |
| JP | 2006-092437 A | 4/2006 |

OTHER PUBLICATIONS

Notification of Reasons for Refusal issued in corresponding Japanese Patent Application No. 2006-127934 mailed on May 7, 2008, and English translation thereof.

* cited by examiner

*Primary Examiner* — Thierry Pham
(74) *Attorney, Agent, or Firm* — Buchanan Ingersoll & Rooney PC

(57) ABSTRACT

The Job executing device comprises a Job executing unit of executing a job concerning image data, an execution instruction-receiving unit of receiving an instruction for job execution sent to the Job executing unit by a user who is authenticated by an authentication unit, a memory unit of storing the notification destination corresponding to user identification information inputted for user authentication, and a notification unit of notifying the notification destination corresponding to the inputted user identification information of the instruction of job execution after receipt of the instruction for job execution by the execution instruction-receiving unit.

15 Claims, 23 Drawing Sheets

1100

To: tanaka@abc.co.jp cc:

Subject: Notification of use of Scan to E-mail

A document was sent to : kimura@abc.co.jp by Scan to E-mail at 10:00, 05.03.04 by using a color printer 1150.

※Click the button below to lock the corresponding user ID, if you are not aware of the use above.

[ Lock user ID ]

If you wish to change the authentication password, register old and new passwords in the open columns below, and click the Change Authentication Password button.

Old password
New password
New password (for confirmation)

[ Change authentication password ]

FIG.17

JOB EXECUTING DEVICE, JOB EXECUTING AND PROCESSING METHOD, AND JOB EXECUTING AND PROCESSING PROGRAM

This application claims priority under 35 U.S.C. §119 to Japanese Patent Application No. 2006-127934 filed on May 1, 2006, the entire disclosure of which is incorporated herein by reference in its entirety.

BACKGROUND OF THE INVENTION

1. Field of the Invention

The present invention relates to an Job executing device applicable to image-forming devices including MFP's (Multi Function Peripherals) for example having a Scan to E-mail function, a Job executing and processing method used in the Job executing device, and a Job executing and processing program stored on a computer readable medium to make a computer execute the job execution processing.

2. Description of the Related Art

The following description sets forth the inventor's knowledge of related art and problems therein and should not be construed as an admission of knowledge in the prior art.

Image-forming devices including multifunctional digital processing machines (MFP's) having an image data-transmitting function, a print function and a copying-machine function have been known as Job executing devices. In addition, Job executing devices that authenticate a user by comparing the user identification information (user ID) or verification information such as password inputted by the user with verification information previously registered and allow only permitted users to use each function of the device are also known (e.g., Japanese Unexamined Patent Publication No. 2006-35631).

Also known are devices in which user identification information and the like are stored in a memory medium such as IC card and user authentication is performed by comparing previously registered information with the information read from the memory medium, and thus, which can only be used by the user thus permitted (e.g., Japanese Unexamined Patent Publication No. 2006-92437).

However, conventional Job executing devices having the authentication function described above caused a problem that unauthorized user pretending to be an authorized user uses the device by using leaked verification information or information obtained from lost memory medium.

To solve the problem above, a method of notifying an authenticated user that the user is indeed authenticated by user authentication is disclosed.

Specifically in such a device, the IP address of a computer connected via a network and the user ID of the user who uses the computer are stored as they are associated with each other, and, when a user ID is accepted for user authorization by the computer, notification information indicating that the user authentication is completed is sent to the IP address stored as associated with the user ID (e.g., Japanese Unexamined Patent Publication No. 2004-297680).

Even with a Job executing device allowing use of various functions only after user authentication, a permitted user occasionally leaves the device temporarily during operation. Alternatively, with a Job executing device prohibiting operation after a certain period of time from completion of operation, the permission continues for a certain period after a user completes operation and leaves the device. Under such a condition, an unpermitted user may use the device unauthorizedly for a certain period when a permitted user leaves the device temporarily device or after the user leaves the device after operation.

However, by the known method described in Japanese Unexamined Patent Publication No. 2004-297680 above, which notifies the notification destination of authenticated user that the user authentication is completed after user authentication is performed, if an non-permitted user attempts unauthorized use of the device after authentication, the device regards the non-permitted user as a normal user.

Thus, such a device had a problem that it was not possible to prevent the unauthorized use of device by a non-permitted user for a certain period when a permitted user leaves the device temporarily device or after the user leaves the device after operation or to take a proper action to the unauthorized use without delay.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

An object of the present invention is to provide a Job executing device that prevents unauthorized use after user authentication or allows countermeasures to be taken to the unauthorized use.

Another object of the present invention is to provide a Job executing and processing method used in the Job executing device.

Yet another object of the present invention is to provide a Job executing and processing program stored on a computer readable medium to make the computer of the Job executing device execute the job.

A first aspect of the present invention is
A Job executing device, comprising:
a Job executing unit of executing a job concerning image data;
an execution instruction-receiving unit of receiving an instruction for job execution sent to the Job executing unit by a user authenticated by an authentication unit;
a memory unit of storing a notification destination corresponding to user identification information inputted for user authentication; and
a notification unit of notifying the notification destination corresponding to the inputted user identification information of a notification of the job execution, after receipt of the instruction for the job execution by the execution instruction-receiving unit.

A second aspect of the present invention is
a Job executing and processing method, comprising a step of executing a job concerning image data, a step of receiving an instruction for job execution sent by a user authenticated by an authentication unit, and a step of notifying the notification destination corresponding to the user identification information inputted for user authentication of the instruction for job execution after receipt of the instruction for job execution.

A third aspect of the present invention is a Job executing and processing program stored on a computer readable medium to make a computer execute the steps, comprising executing a job concerning image data, receiving an instruction for job execution sent by a user authenticated by an authentication unit, and notifying the notification destination corresponding to the user identification information inputted for user authentication of the instruction for job execution after receipt of the instruction for job execution.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as, limiting other embodiments or the claims.

BRIEF DESCRIPTION OF THE DRAWINGS

The preferred embodiments of the present invention are shown by way of example, and not limitation, in the accompanying figures, in which:

FIG. 17 is a chart showing another example of the notification mail sent to a user registered address;

DETAIL DESCRIPTION OF THE PREFERRED EMBODIMENTS

In the following paragraphs, some preferred embodiments of the invention will be described by way of example and not limitation. It should be understood based on this disclosure that other modifications can be made by those in the art based on these illustrated embodiments.

Figure 1:
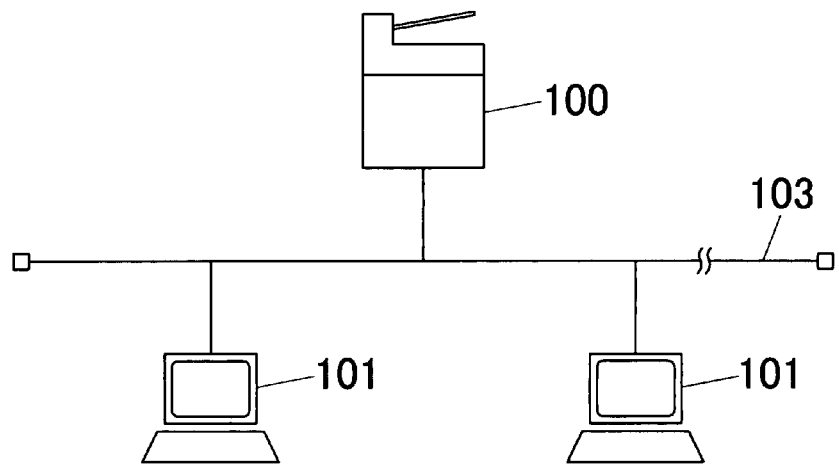
FIG. 1 is a schematic diagram of showing a Job executing system having a Job executing device in an embodiment of the present invention.

FIG. 1 is a schematic diagram showing a Job executing system having a Job executing device in an embodiment of the present invention.

In FIG. 1, the Job executing system include a Job executing device 100 and multiple user terminals 101, and the Job executing device 100 and the user terminals 101 are connected to each other, via a network 103 such as in-company LAN.

The Job executing device 100 is, for example, an image-forming device MFP having a user authentication function as well as a copying-machine function, a printer function, a facsimile function, and a data-transmitting function. The data-transmitting function is a function to transmit the image data in the electronic form obtained from paper manuscript, or the image data stored in the device, via the network 103 to external devices such as user terminals 101, for example, by Scan to E-mail function.

The user terminal 101 is, for example, a personal computer.

Figure 2:
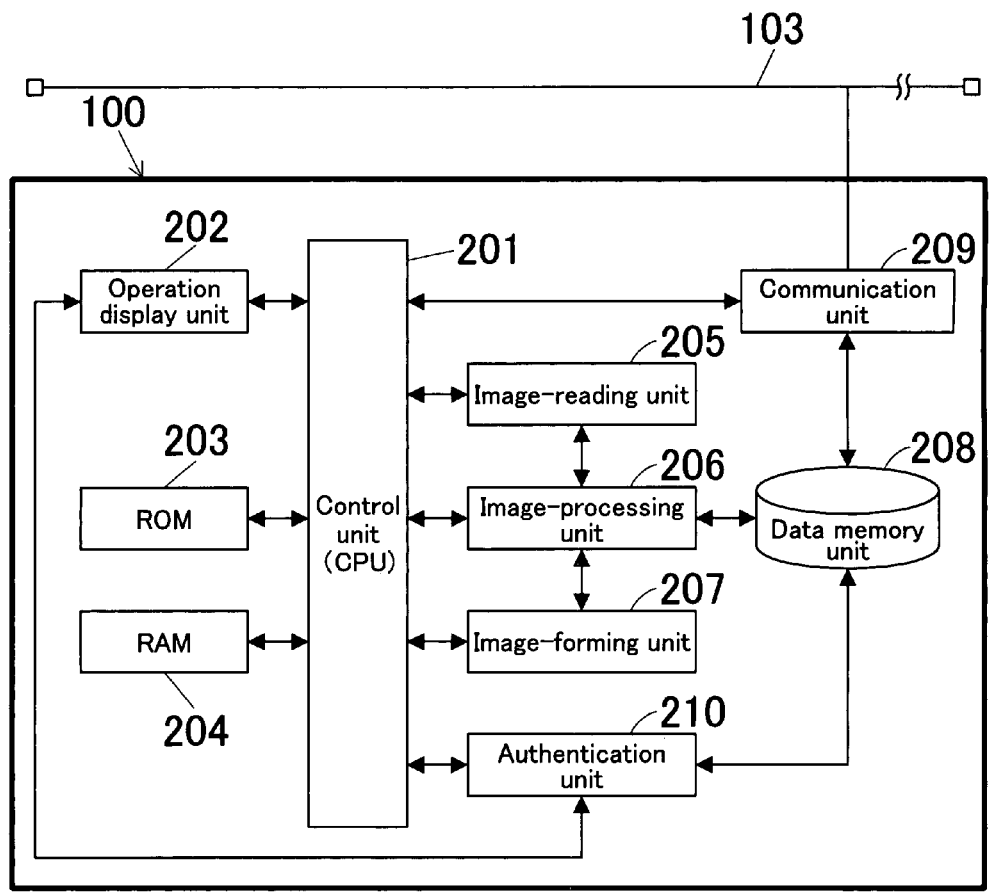
FIG. 2 is a block diagram showing the electrical configuration of the Job executing device.

FIG. 2 is a block diagram showing the electrical configuration of the Job executing device 100.

In FIG. 2, the Job executing device 100 has an operation display unit 202 for setting operation of various functions and displaying various screens, an authentication unit 210 for user authentication, an image-processing unit 206 of processing the image data into electronic data, an image-processing unit 206 of processing the image data in the electronic form, an image-forming unit 207 of printing the image data on paper, a communication unit 209 of communication data via the network 103, a CPU 201 of controlling the entire Job executing device 100 integrally, a ROM 203 storing the operational program of CPU 201, and a RAM 204 used as a work region when the CPU 201 executes the operational program.

The data memory unit 208 stores various data including verification information such as user identification codes (user ID's) and passwords, mail addresses of the notification destinations corresponding to the user ID codes, the image data in the electronic form, image data transmitted from external devices, and the like.

Although the configuration of a so-called internal authentication system in which the Job executing device 100 contains an authentication unit 210 inside shown in the present embodiment, the system may have another configuration called an external authentication system in which an external authentication server is used.

Hereinafter, a series of operations executed in a Job executing device 100 in the configuration above will be described.

When a user logs in to the Job executing device 100, a screen demanding input of a user ID and a password for user authentication is displayed on the operation display unit 202.

When a user ID and a password are inputted in the screen, the CPU 201 makes the authentication unit 210 verify them. That is, the user ID and the password stored in the data memory unit 208 and the inputted user ID and password are compared in the authentication unit 210, and it is judged whether use of each function is allowed, based on the result.

When the user designates a transmission destination after user authentication and instructs job execution by using a data-transmitting function such as Scan to E-mail function (function of transmitting the image data read in image-reading unit 205 or the image data stored in the data memory unit 208 to a designated destination by electronic mail) in the operation display unit 202, the CPU 201 accepts the instruction for job execution and transmits the image data via the communication unit 209 to the designated transmission destination.

In the present embodiment, upon receiving the instruction for job execution, the CPU 201 automatically transmits a notification concerning the instruction for job execution, before or after data transmission, to the notification-destination mail address associated with the user ID stored in the data memory unit 208 (hereinafter, referred to also as registered address).

Because a notification concerning the job execution instruction is sent to the registered address automatically after instruction for job execution as described above, even if a third person instructs job execution for unauthorized use during a period when an authenticated authorized user temporarily leaves the device in operation using an operation display unit 202 or during a certain period of permitted use after operation, the fact is notified to the registered address of the authorized user. Thus, when a job execution is instructed by a user other than an unauthorized user, the authorized user can realize the fact and find unauthorized use immediately. As a result, it is possible to prevent unauthorized use before job execution, for example, by going to the device, and to take optimal corrective action to the unauthorized use without delay even after job execution.

Figure 3:
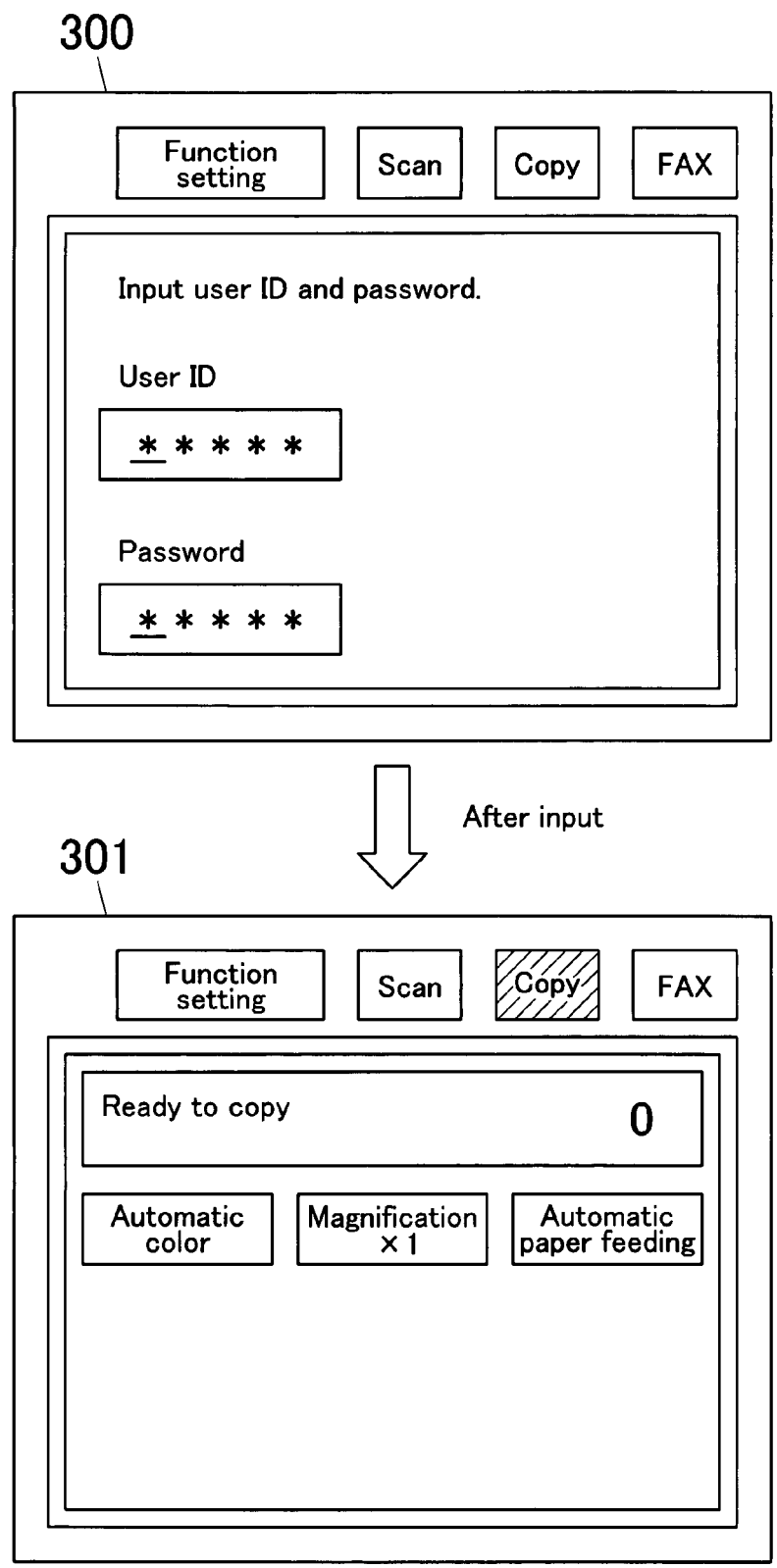
FIG. 3 is a chart showing an example of the display on the user authentication screen.

FIG. 3 is a chart showing a screed demanding input of verification information displayed on the operation display unit 202 during user authentication.

The input screen 300 in FIG. 3 displays a statement demanding input of a user ID and a password and the input columns thereof.

After input of the user ID and password of the user, the screen advances to a standby screen 301 demanding job designation. The standby screen is a screen designating the "Copy" job, but push on the "Scan" key leads to jump to a screen using the Scan to E-mail function. When the user designates a transmission destination and instructs reading of the manuscript fed into the image-reading unit 205 in the screen, the manuscript is read, and the image data is transmitted to the designated transmission destination by mail.

When the "Function Setting" key is pushed in the screen 301 of FIG. 3, the screen advances to a screen for setting various parameters concerning user notification, as will be described below.

Figure 4:
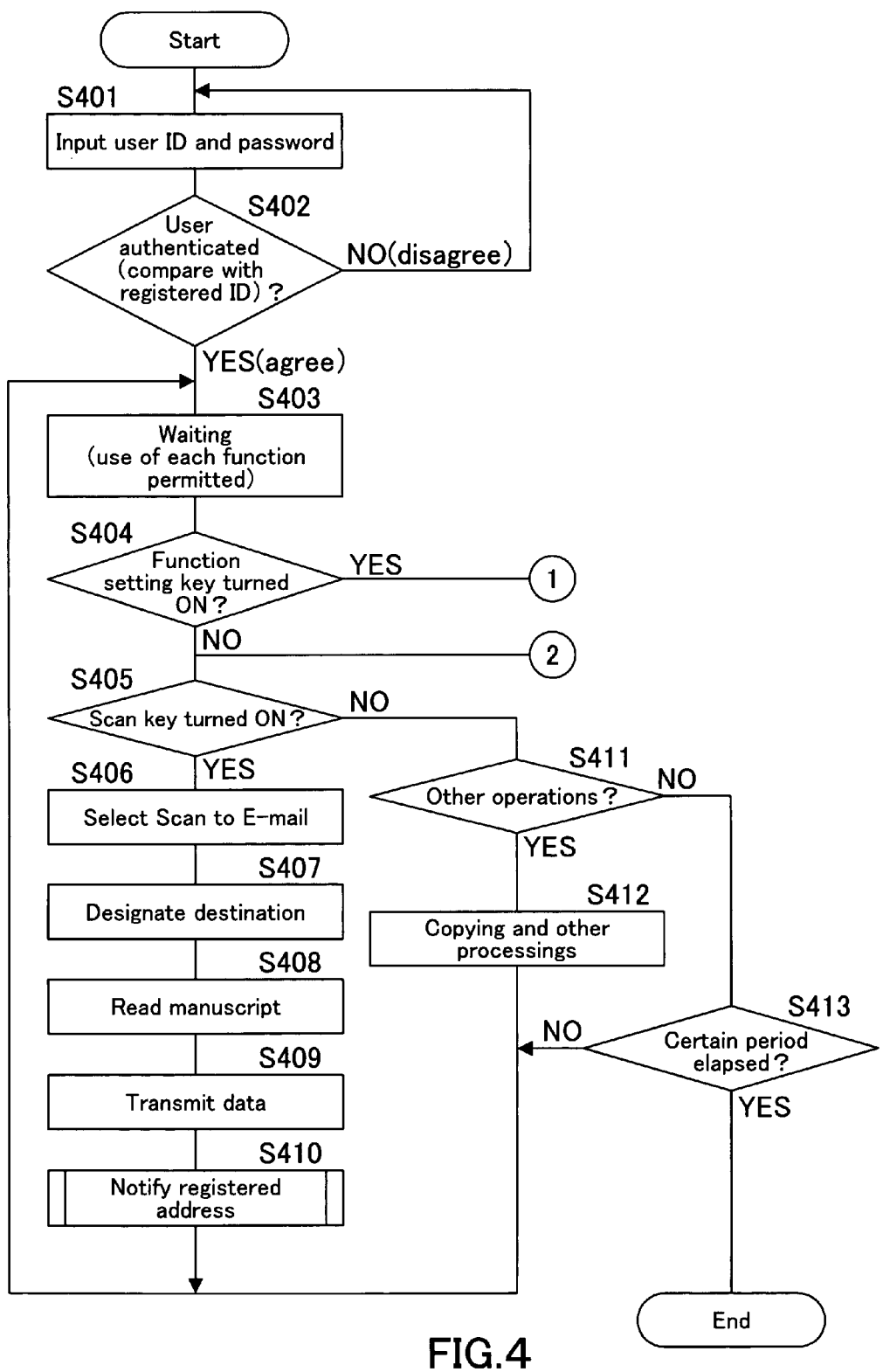
FIG. 4 is a flowchart showing the processings conducted by the CPU in the Job executing device, according to the operations by the user using the Job executing device.

FIG. 4 is a flow-chart showing the processings performed in the CPU 201 of Job executing device 100 according to the operations by the user for using the Job executing device 100. The processings in the various flowcharts shown below are performed by CPU 201 according to the operational program, for example, stored in ROM 203.

In step S401 of FIG. 4, after the power is turned on, the input screen 300 (FIG. 3) on the operation display unit 202 first displays a screen demanding a user ID and a password, and accepts the user ID and the password inputted by the user. Then in step S402, it is judged whether the inputted user ID and password are in accord with the ID and password previously registered.

If the inputted ID and password agree with the previously registered ID and password (YES in step S402), use of each function in the Job executing device 100 is permitted in step S403, and the operation display unit 202 displays a screen showing that the system is in the stand-by mode (screen 301 in FIG. 3).

If the inputted ID and password are not in accord with the previously registered ID and password (NO in step S402), the processing goes back to step S401.

Figure 5:
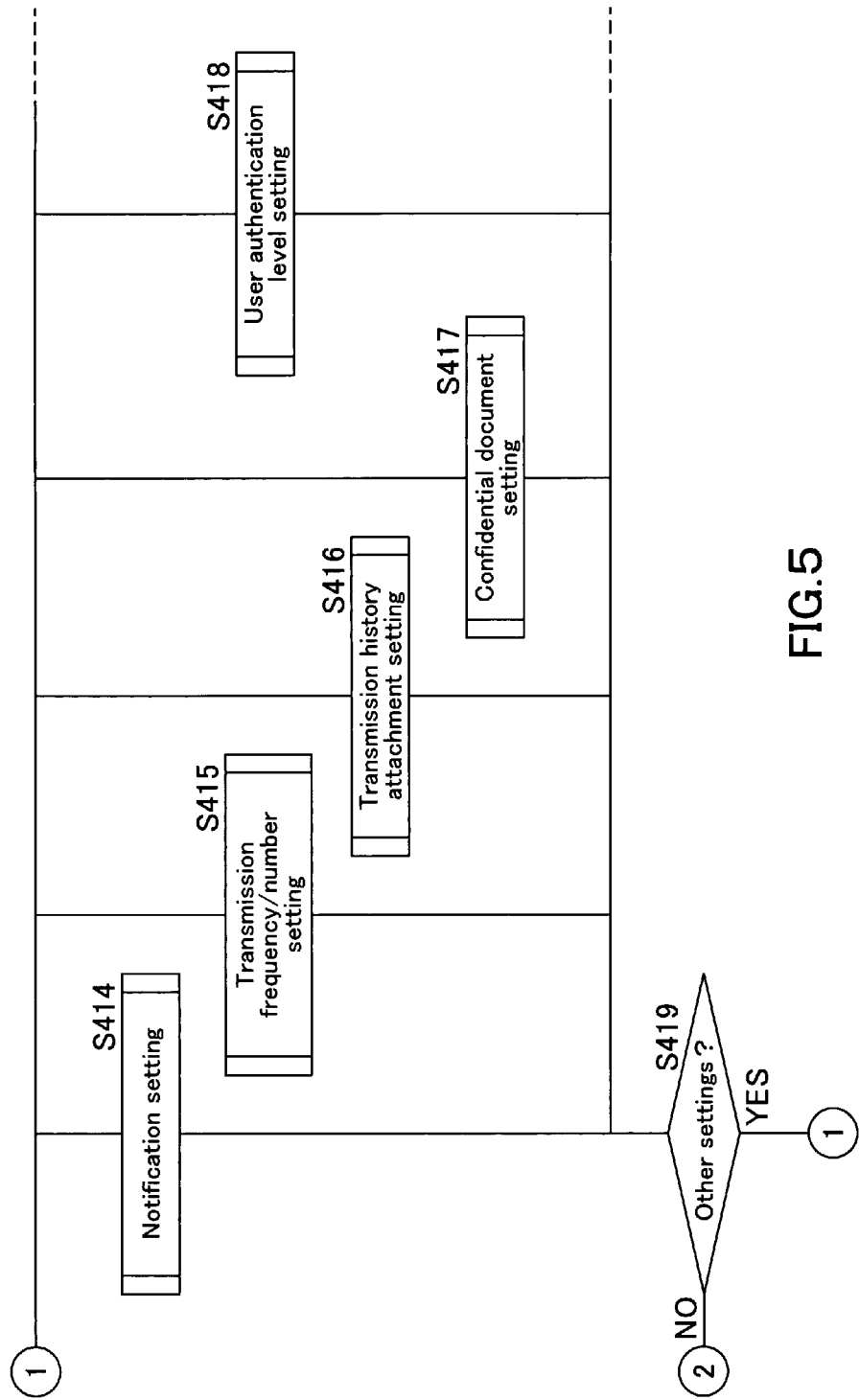
FIG. 5 is a flowchart showing part of the flowchart shown in FIG. 4.

Then in step S404, it is judged whether the "Function Setting" key is pushed; if it is pushed (YES in step S404), processing for setting various parameters in FIG. 5 is performed. If it is not pushed (NO in step S404), the processing advances to step S405.

As shown in FIG. 5, various settings such as notification setting (step S414), transmission frequency/number setting (step S415), transmission history attachment setting (step S416), confidential document setting (step S417), and user authentication level setting (step S418) can be performed in the present embodiment. Settings to be preformed are decided according to the setting-item keys selected in a Setting-Item Selection screen displayed when the "Function Setting" key is pushed (not shown in the Figure).

Figure 6:
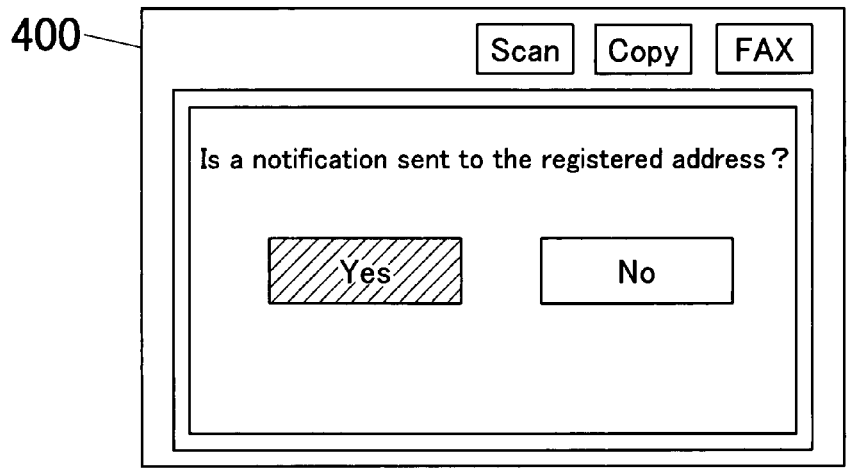
FIG. 6 is a chart showing a screen for setting whether a notification is sent to a registered address.

The notification setting (step S414) determines whether a notification of transmission instruction when an instruction to transmit the image data is given is sent to the registered address corresponding to the inputted user ID, i.e., to the registered address of the authorized user. If the user selects the "Notification Setting" in the Setting-Item Selection screen, a screen 400 showing a "Notice" key and a "Don't notice" key is displayed on the operation display unit 202, as shown in FIG. 6. When the user selects the "Notice" key, CPU 201 performs setting for notification. When the user selects the "Don't notice" key, CPU 201 performs setting for no notification. In such a case, no notification is sent to the registered address of the user. It is thus possible to optimize the system according to the use environment, because it is possible to select setting for notification.

Figure 7:
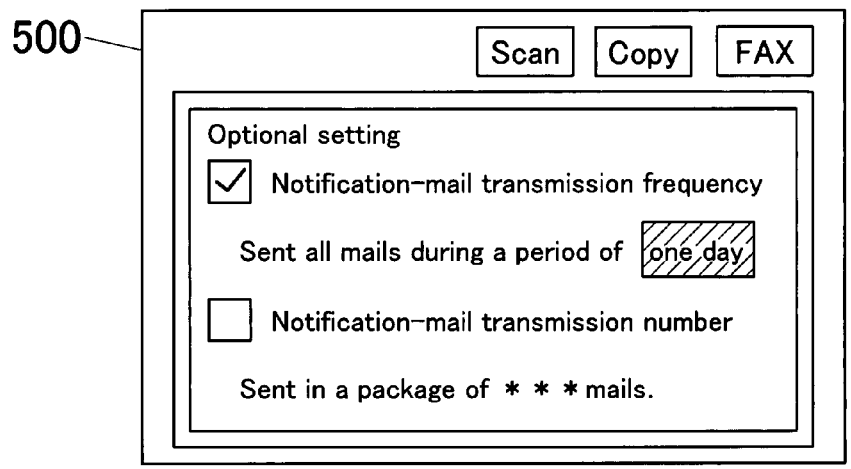
FIG. 7 is a chart showing a screen for setting the number or frequency of the jobs executed.

The transmission frequency/number setting (step S415) determines the number or frequency of the jobs executed when the notification to the registered address is desirably sent in a particular number of jobs executed or at a particular frequency. When the user selects the "Transmission Frequency/Number Setting" in the Setting-Item Selection screen, as shown in FIG. 7, a setting screen 500 showing the number or frequency of the jobs executed is displayed for option setting on the operation display unit 202. The corresponding check box is checked and the frequency or number is inputted for setting the number or frequency of the jobs executed, and the system is set to the inputted values. It is thus possible to notify the registered address all at once in a particular number of jobs executed or at a particular frequency by the setting above and thus, to prevent inconvenience of repeated notification to the same registered address every time an instruction to transmit image data is given.

Figure 8:
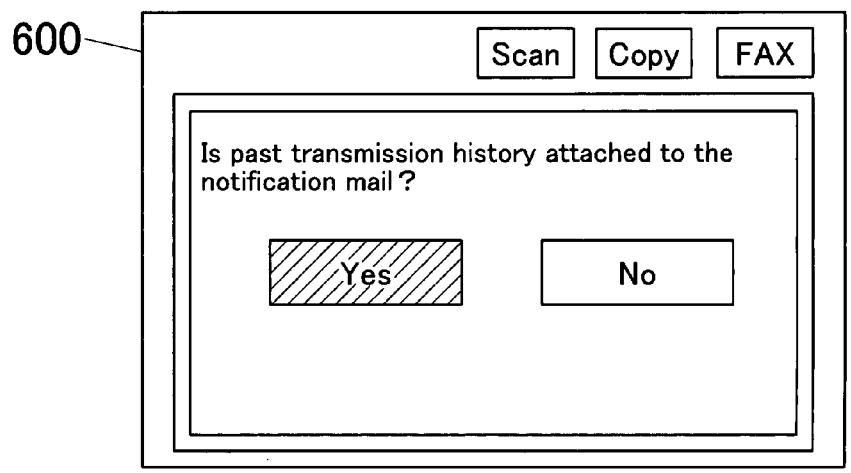
FIG. 8 is a chart showing a screen for setting whether a notification is sent with a past transmission history attached.

The transmission history attachment setting (step S416) determines whether to notify with the past transmission history. If the user selects the "Transmission History Attachment Setting" in the Setting-Item Selection screen user as shown in FIG. 8, a screen 600 showing an "Attach" key and a "Don't Attach" key are displayed on the operation display unit 202. When a user selects an "Attach" key, CPU 201 performs setting for notification with an attached transmission history. When a user selects a "Don't Attach" key, CPU 201 performs setting for notification without transmission history. By notifying the user with a past transmission history in this way, it is possible to make the user recognize unauthorized use reliably if the unauthorized use is performed repeatedly.

Figure 9:
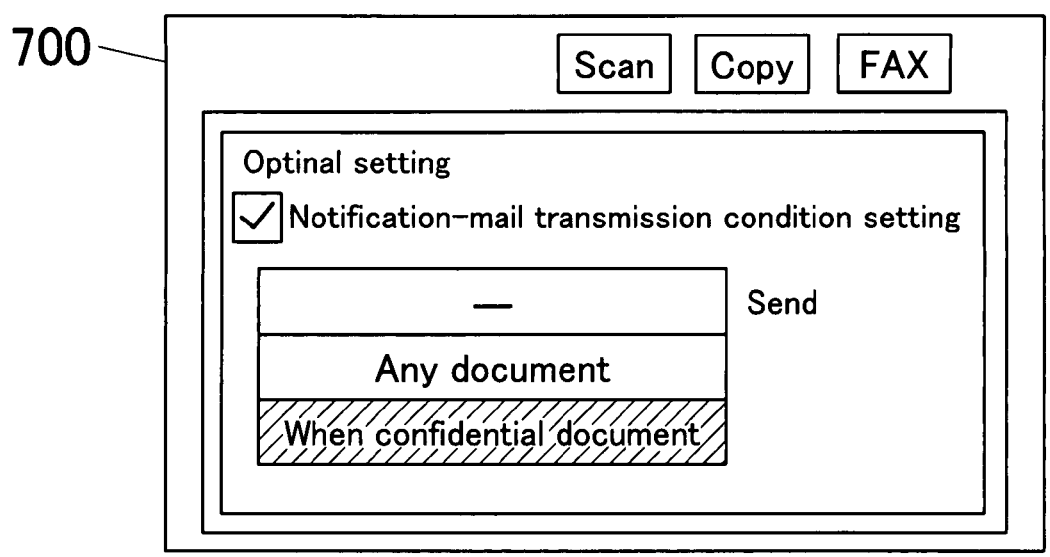
FIG. 9 is a chart showing a screen for setting whether a notification is sent to the registered address only when the image data concerns a confidential document.

The confidential document setting (step S417) is a setting for sending a notification to the registered address only when the transmitted image data concerns a confidential document. If the user selects the "Confidential Document Setting" in the Setting-Item Selection screen, a setting screen 700 concerning the notification-mail transmission condition is displayed for optional setting on the operation display unit 202, as shown in FIG. 9. When a user who wishes to be notified only when the data concerns a confidential document checks the corresponding check box and selects a "When Confidential Document" key, a notification is sent to the user only when the image data concerns a confidential document and demands security. By notifying only when the image data concerns a confidential document in this way, it is possible to prevent notification undifferentiated between when the image data does not concern a confidential document and when there is no concern about the adverse effect by unauthorized use. Thus, such a system, which notifies only when the image data concern a confidential document and truly demands security, is significantly valuable practically.

Figure 10:
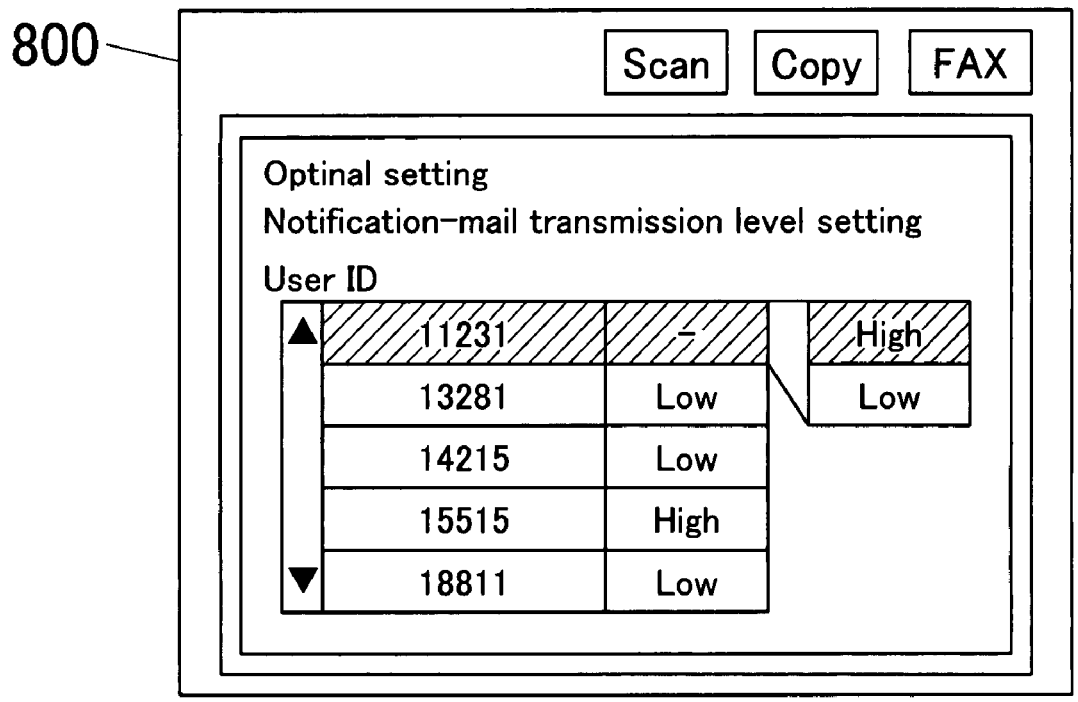
FIG. 10 is a chart showing a screen for setting whether a notification authentication level is determined for each user.

The user authentication level setting (step S418) determines the authentication level of the notification to each user. When the user selects the "User Authentication Level Setting" in the Setting-Item Selection screen, a screen 800 showing the level setting to each user ID is displayed for optional setting on the operation display unit 202, as shown in FIG. 10. In the setting, "High" or "Low" is inputted to each user ID. It is possible to notify each user effectively at a suitable authentication level in this way.

Each condition set by CPU 201 is stored in the data memory unit 208.

CPU 201 judges whether there are other settings instructed in step S419 after each setting; and, if other settings are instructed (YES in step S419), the other settings are performed based on the user input. If there is no other setting instruction (NO in step S419), the processing advances to step S405 in FIG. 4.

In step S405, it is judged whether the "Scan key" is pushed; if the "Scan" key is pushed (YES in step S405), the operational mode of Scan to E-mail is selected in step S406, and an operational screen of Scan to E-mail function is displayed on the operation display unit 202.

Then, when the user designates a destination, transmission address of the image data, CPU 201 accepts it in step S407.

When the user places a manuscript in the image-reading unit 205 and pushes a start key (not shown in the Figure), CPU 201 accepts the instruction for job execution and instructs to read the manuscript image and generates image data in step S408.

CPU 201 then transmits the generated image data to a designated destination in step S409, and transmits a message indicating that the image data is sent, to the registered address corresponding to the user ID previously stored in the data memory unit 208 by electronic mail in step S410. Then, the processing advances to step S403 and becomes in the stand-by mode.

On the other hand, it the "Scan" key is not pushed in step S405 (NO in step S405), it is judged whether there is other key operation, for example, for using the copying-machine function by the user in step S411. If there is other key operation (YES in step S411), copying or the other processing is performed according to the operation in step S412, and the processing advances to step S403 and the CPU 201 becomes in the stand-by mode.

If there is no other key operation in step S411 (NO in step S411), it is judged whether a certain period elapsed in step S413. If a certain period elapses without any key operation (YES in step S413), the series of treatment is completed, and the screen goes back into the initial state (screen demanding input of a user ID and a password). If a certain period does not elapse (NO in step S413), the processing goes to step S403 and the CPU 201 become in the stand-by mode.

Figure 11:
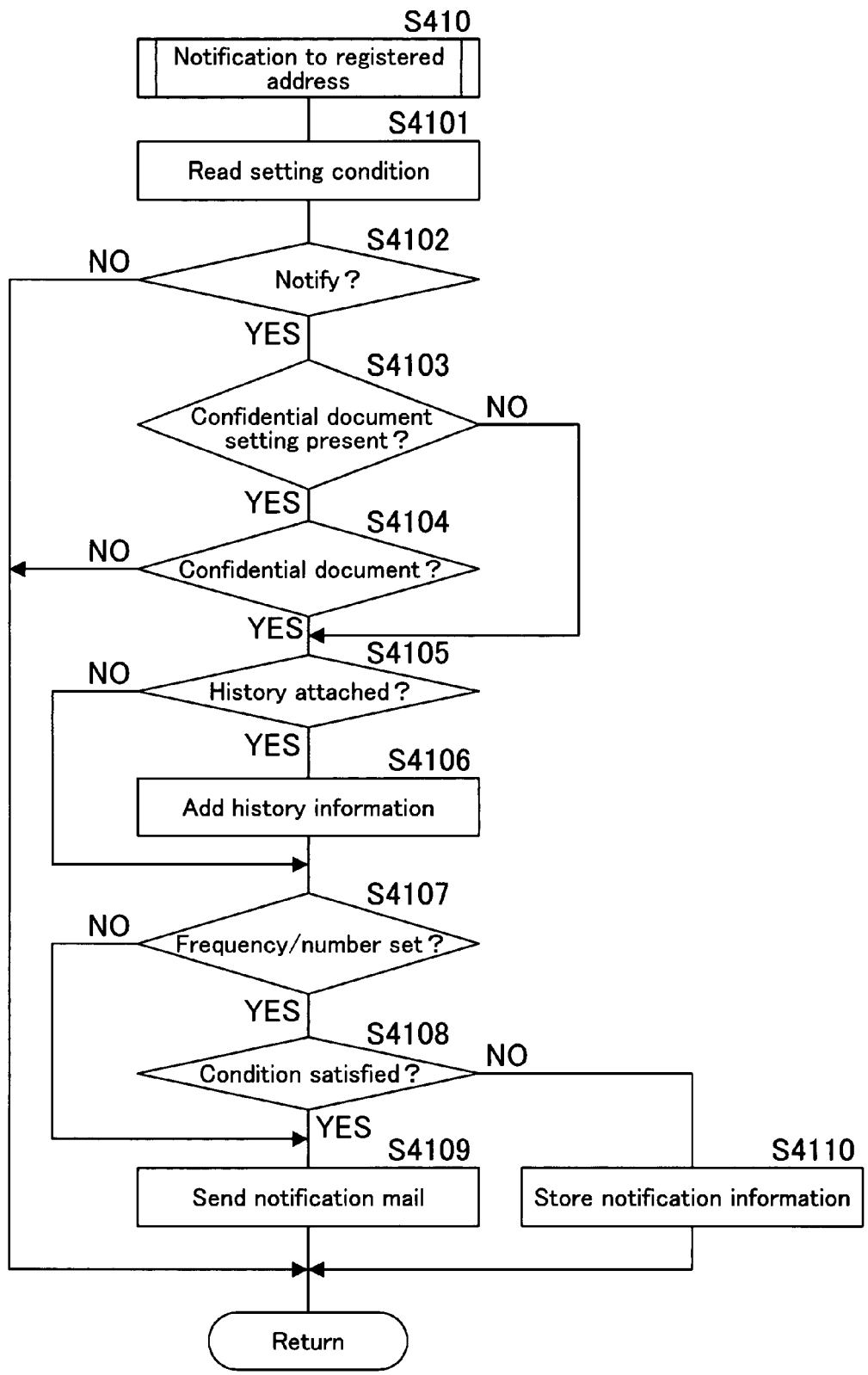
FIG. 11 is a flowchart showing the subroutine notifying the registered address (step S410 in FIG. 4)

FIG. 11 is a flowchart showing the subroutine for notifying the registered address (S410 in FIG. 4).

In step S4101 of FIG. 11, CPU 201 reads the setting condition previously set, for example, by the user.

Then in step S4102, it is judged whether there is a setting for notification.

If there is no setting for notification (NO in step S4082), the subroutine goes back to the main routine. If there is a setting for notification (YES in step S4102), it is judged whether there is a setting for notification when the image data concerns a confidential document in step S4103.

If there is no notification setting when the data concerns a confidential document (NO in step S4103), the subroutine advances to step S4105. If there is a notification setting when the data concerns a confidential document (YES in step S4103), it is judged whether the image data to be transmitted concerns a confidential document in step S4104. Whether the image data concerns a confidential document is designated by the user during designation of the image-data transmission job, and the system decides it according to the result.

If it does not concern a confidential document (NO in step S4104), the processing goes back to the main routine, and if it concerns a confidential document (YES in step S4104), the subroutine advances to step S4105.

In step S4105, it is judged whether there is a setting for notification with attached transmission history information. If there is no setting for notification with attached history information (NO in step S4105), the subroutine advances to step S4107. If there is a setting for notification with attached transmission history information (YES in step S4105), the transmission history information is attached in step S4106, and the subroutine advances to step S4107.

It is judged whether there is a frequency/number setting in step S4107; if there is no frequency/number setting (NO in step S4107), the processing advances to step S4109; and if there is a frequency/number setting (YES in step S4107), it is judged whether the frequency or number previously set is reached in step S4108. If the frequency or number previously set is reached (YES in step S4108), a notification mail is sent to the registered address in step S4109, and the subroutine goes back to the main routine.

If the frequency or number previously set is not reached (NO in step S4108), the notification information is stored once in step S4110, and the subroutine goes back to the main routine.

Figure 12:
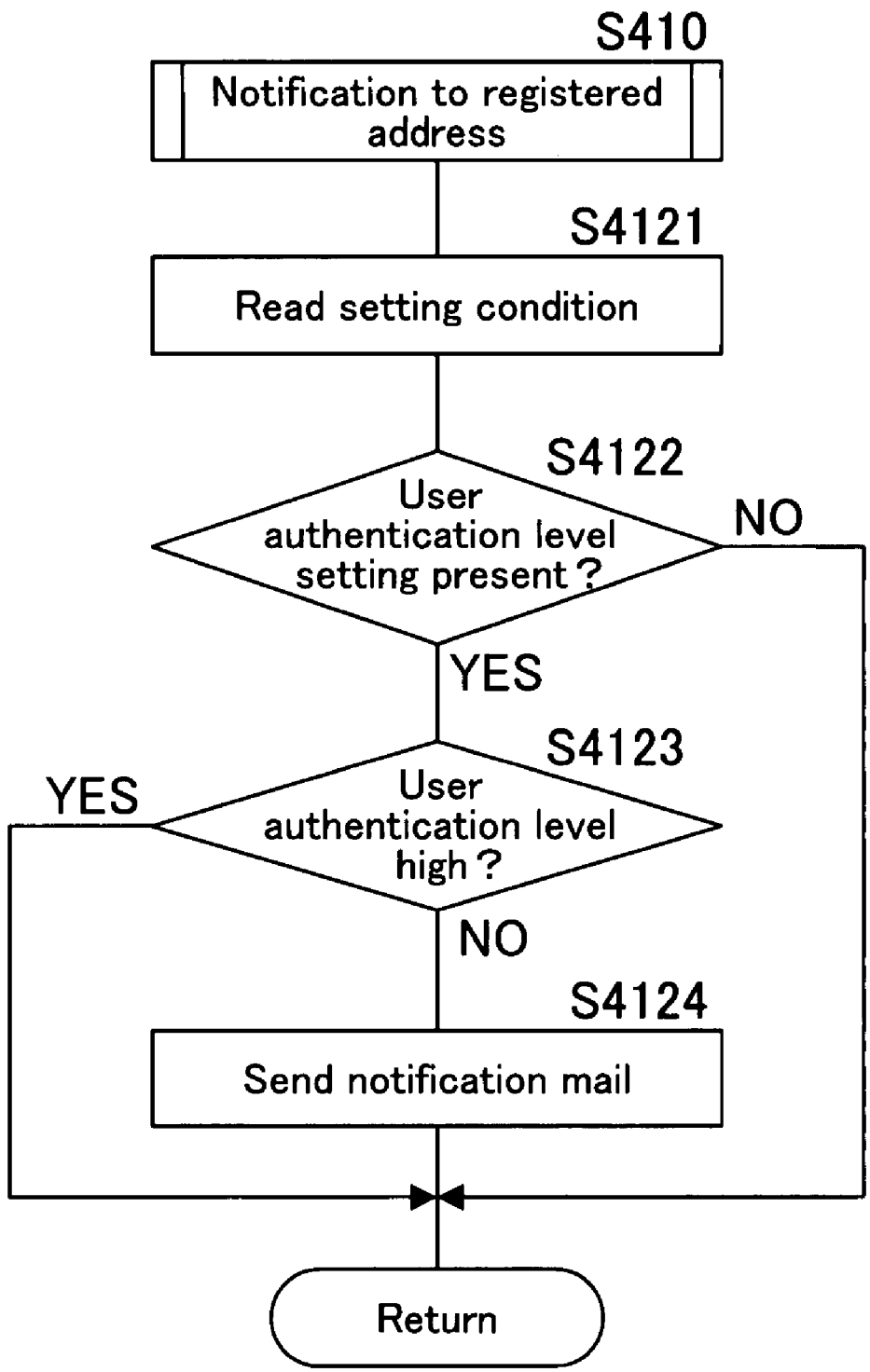
FIG. 12 is a flowchart showing the processing for notifying the registered address when the authentication level (notification level) for each user ID is set (step S410 in FIG. 4)

FIG. 12 is a flowchart showing the procedure of notifying the registered address when there is a setting of the authentication level (notification level) for each user ID as described in FIG. 10 (step S410 in FIG. 4).

In step S4121 of FIG. 12, CPU 201 reads the setting condition previously set.

Then in step S4122, it is judged whether there is a setting of the user authentication level.

If there is no setting concerning user authentication level (NO in step S4122), the subroutine goes back to the main routine automatically. If there is a setting concerning user authentication level (YES in step S4122), it is judged whether the authentication level for the corresponding user is high in step S4123. If the authentication level for the corresponding user is high (YES in step S4123), the subroutine goes back to the main routine, and if the authentication level for the corresponding user is low (NO in step S4123), a notification mail is transmitted to the registered address in step S4124, and the subroutine goes back to the main routine.

Figure 13:
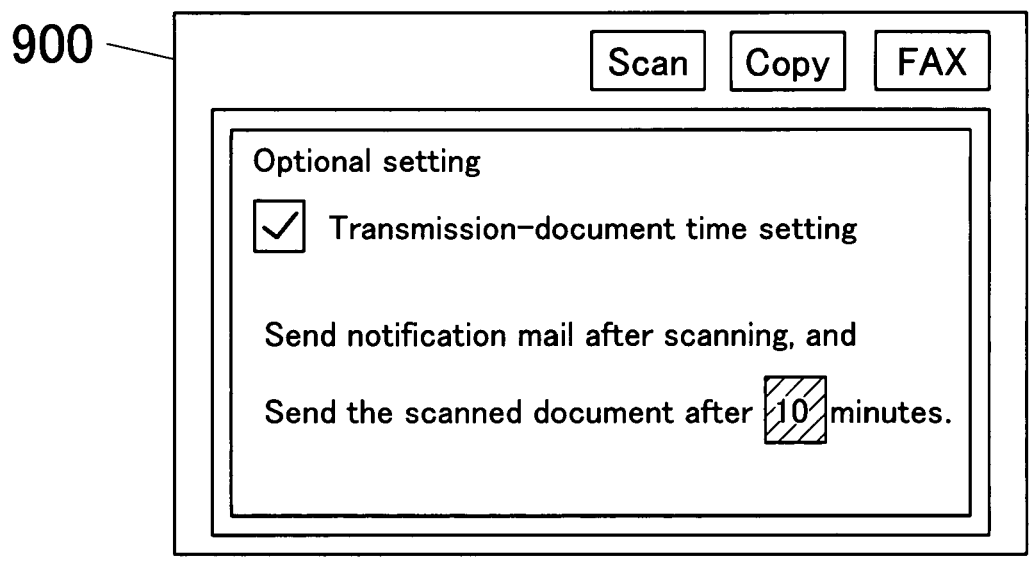
FIG. 13 is a chart showing a screen for setting transmission document time.
Figure 14:
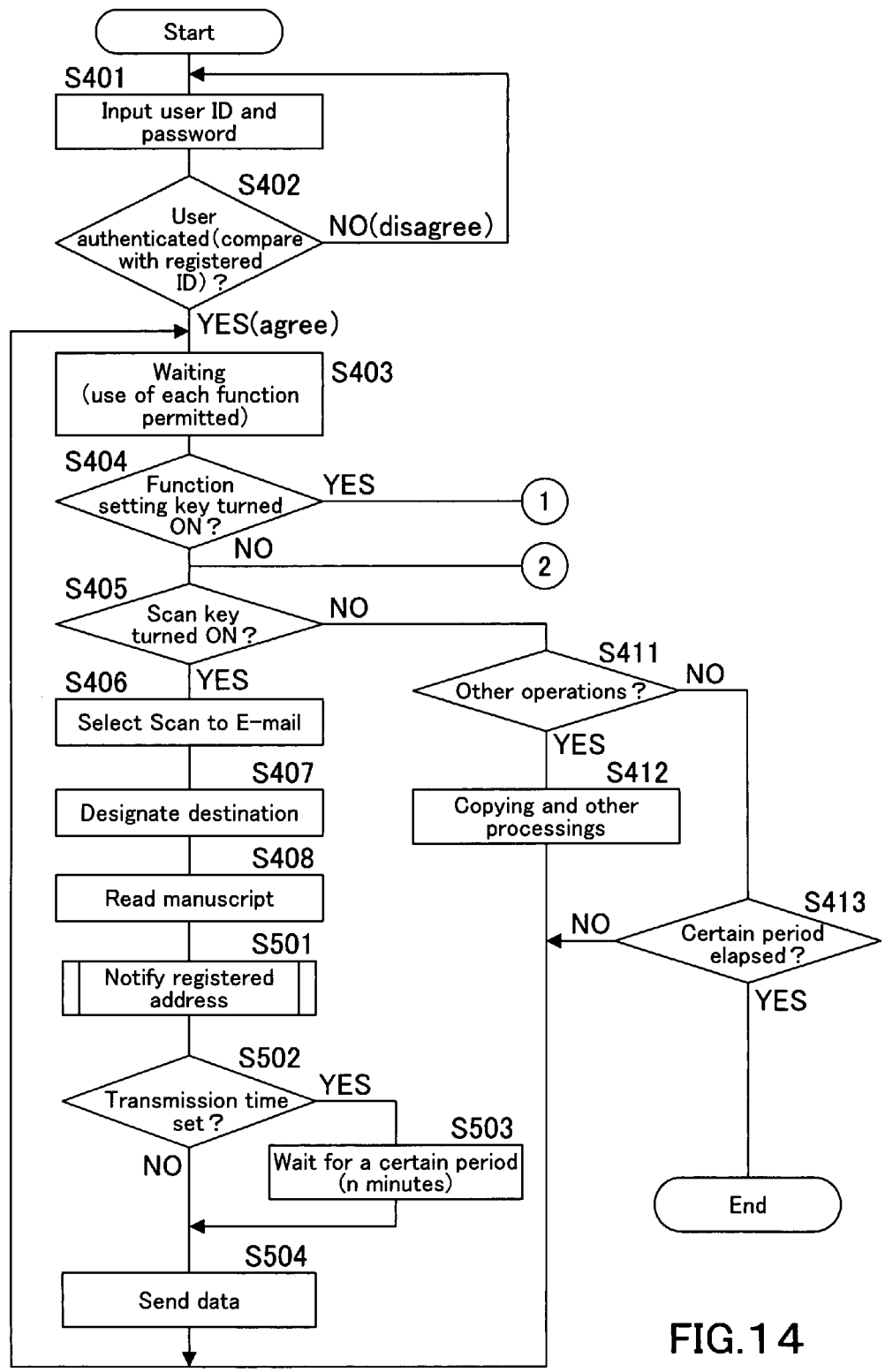
FIG. 14 is a flowchart showing the processing when a user operates the Job executing device under the condition where the transmission document time is previously set.

FIGS. 13 and 14 are charts showing the screen and the flowchart in another embodiment of the present invention. In the present embodiment, image data obtained by scanning is transmitted after notification to the registered address, and it is possible to set the period from data notification to transmission.

That is, as shown in FIG. 13, the user checks the corresponding check box and input the setup time from notification to image-data transmission to the registered address, in the document-transmission period setting screen 900 displayed on the operation display unit 202 for optional setting. Upon receiving the input, CPU 201 sets the period from notification to image-data transmission to registered address.

FIG. 14 is a flowchart showing the procedure when a user operates the Job executing device 100 in the state after the setting is completed.

The operations up to step S408 "Read Manuscript" are the same as those shown in FIG. 4 flowchart, and the same step numbers were allocated as in FIG. 4 and the detailed description thereof is omitted.

In FIG. 14, after reading manuscript, CPU 201 notifies the corresponding registered address that an instruction to transmit image data is given, by electronic mail in step S501.

Then, CPU 201 judges whether there is a transmission-period setting in step S502, and transmits the read image data to the transmission destination immediately in step S504, if there is no setting (NO in step S502).

If there is a transmission-period setting (YES in step S502) in step S503, the CPU waits until the set period (n minutes) and then, transmits the image data after a certain period in step S504.

In this way, the image data is transmitted after a certain period of time from notification to the registered address (notification destination), and thus, the authorized user, who realizes unauthorized use by the notification, can terminated the transmission of the image data, for example, by going to the Job executing device 100 during the period.

Figure 15:
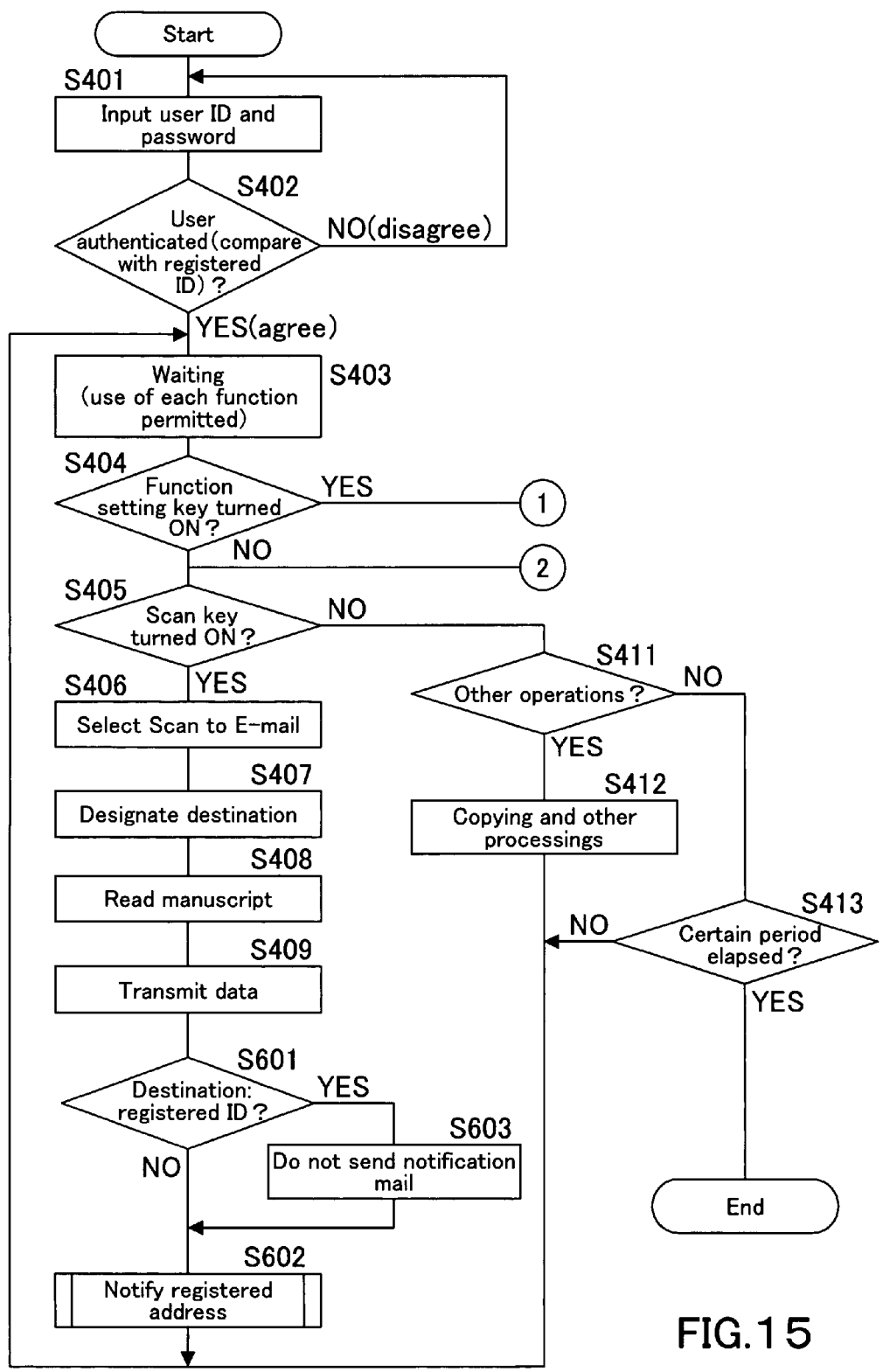
FIG. 15 is a flowchart showing yet another embodiment of the present invention, in which the notification to the registered address is not transmitted, when the transmission address of the image data and the registered address of notification destination are the same as each other.

FIG. 15 is a flowchart showing yet another embodiment of the present invention. In the present embodiment, the notification to the registered address is not transmitted, when the transmission destination address of the image data and the registered address of notification destination are the same as each other.

Steps up to step S409 of "Transmit Image Data" in the processings shown in FIG. 15 are the same as those in the flowchart shown in FIG. 4, and the same step numbers were allocated as in FIG. 4 and the detailed description thereof is omitted.

In step S601 of FIG. 15, CPU 201 judges whether the user ID at the transmission address of image data is the same as the ID of the log-in user; it they are the same (YES in step S601), it decides not to transmit the notification mail in step S603, and the processing goes back to step S403. On the other hand, if the user ID does not agree (NO in step S601), a notification mail is transmitted to the registered address in step S602, and the procedure goes back to step S403.

The image data is in this way transmitted to the registered address when the transmission address of image data agrees with the registered address of notification destination; and it is thus possible to prevent unneeded notification, because the user realizes that the image is transmitted even when the notification mail is not delivered.

Figure 16:
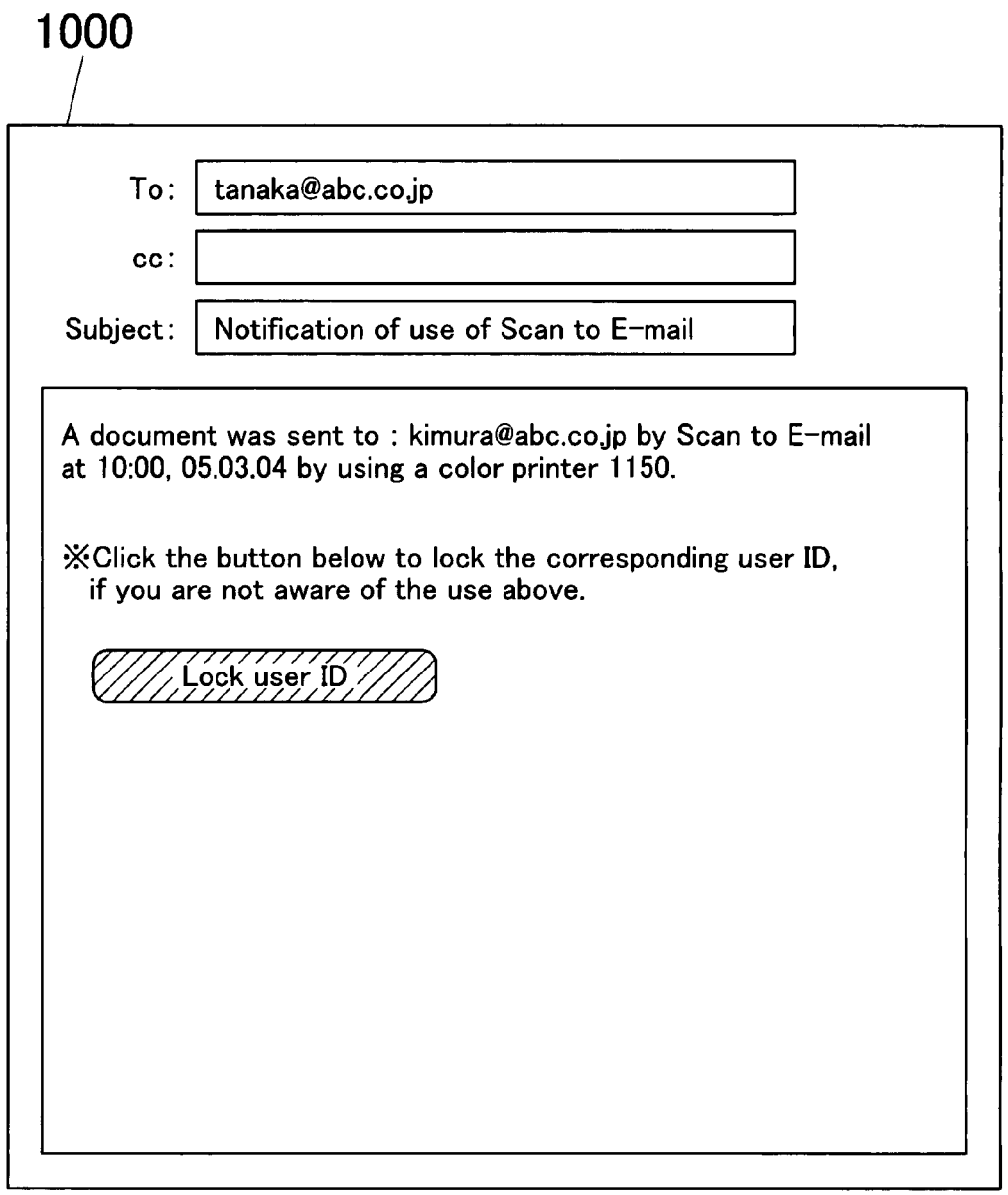
FIG. 16 is a chart showing an example of the notification mail sent to a user registered address.

FIG. 16 is a chart showing an example of the notification mail sent to the user's registered address.

Displayed in the mail 1000 are a message that image data is sent to the transmission destination by the Scan to E-mail function and a message indicating to click the "Lock User ID" button if the data is not transmitted. If the user clicks the "Lock User ID" button, a mail containing the instruction to lock the user ID is sent back to the Job executing device 100. Upon receipt of the return mail, the Job executing device 100 locks the user ID. The procedure will be described below.

FIG. 17 is chat showing another example of the notification mail to the registered address.

In addition to the messages shown in FIG. 16, displayed in the mail 1100 is a column for inputting change of authentication password, and a user who wishes to change the password inputs the passwords before and after change in the input columns. When the user clicks the "Change Authentication Password" button, a mail including a lock-user-ID instruction and/or a change-password request is sent back to the Job executing device 100. Upon receipt of the return mail, the Job executing device 100 locks the user ID and/or changes the password. The procedure will also be described below.

Figure 18:
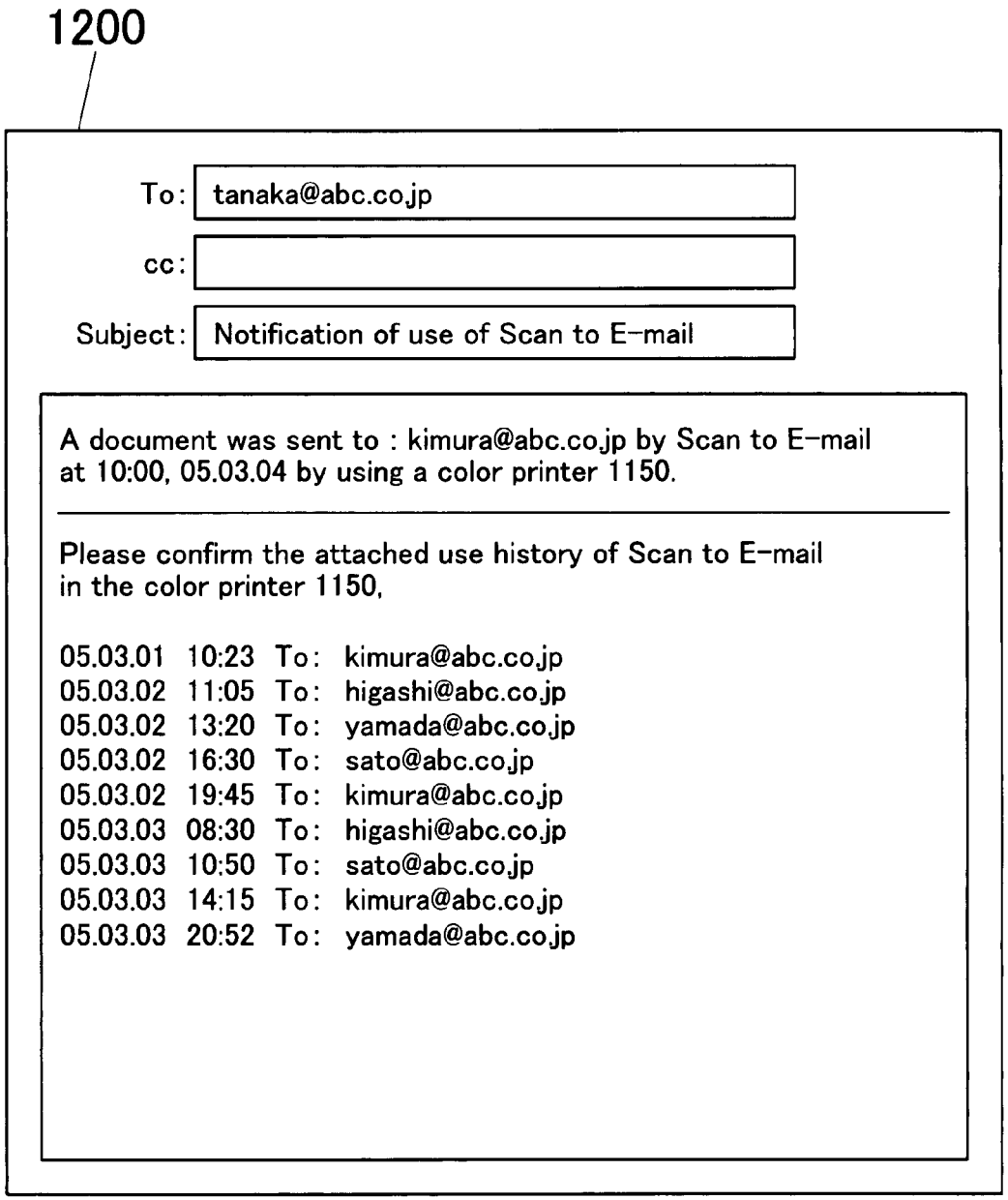
FIG. 18 is a chart showing an example of a notification mail with an attached past transmission history.

FIG. 18 is a chart showing an example of the notification mail with an attached past transmission history.

As shown in FIG. 18, displayed are a message indicating that image data is transmitted to the transmission destination by the Scan to E-mail function in the mail 1200 and also a past transmission history attached thereto.

Figure 19:
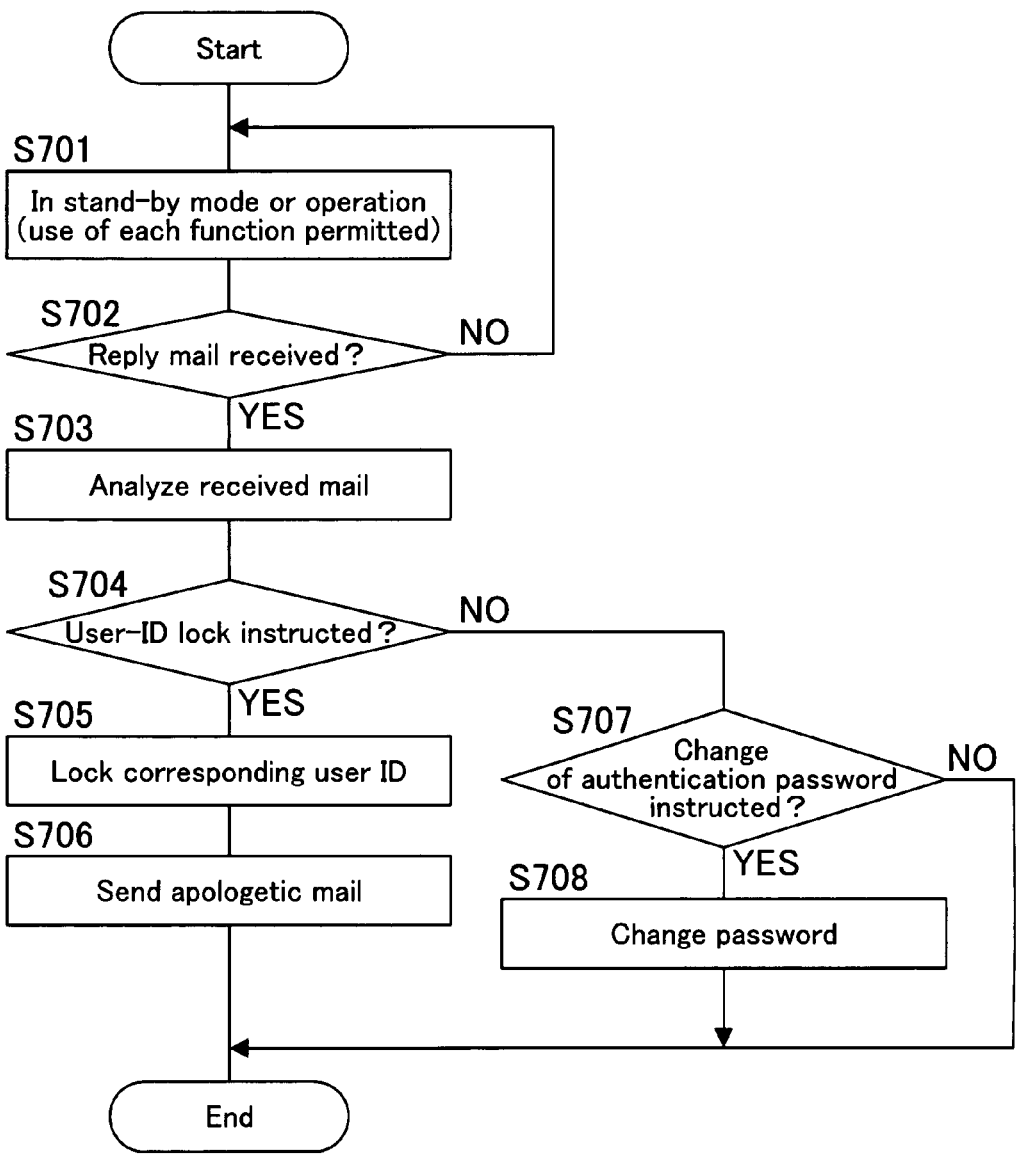
FIG. 19 is a flowchart in yet another embodiment of the present invention showing the processing performed when there is a return mail form a user terminal after notification to the user registered address.

FIG. 19 is a flowchart in yet another example of the present invention, showing the processings when a return mail is delivered from a user terminal 101 after notification to the user's registered address.

In step S701 of FIG. 19, CPU 701 examines whether the log-in user with permitted access is in the stand-by mode or in operation and waits for receipt of the return mail form the notification destination in step S702.

Upon receipt of the return mail (YES in step S702), CPU 201 analyzes the content in the received mail in step S703.

Then in step S704, it is judged whether there is an instruction to lock user ID included in the return mail.

If there is an instruction to lock user ID (YES in step S704), the user ID is locked, prohibiting its use in step S705, and an apologetic mail is transmitted to the transmission address of image data in step S706.

If there is no instruction to lock user ID in the return mail (NO in step S704), it is judged whether there is an instruction to change the authentication password included in the return mail in step S707.

If there is an instruction to change authentication password (YES in step S707), the password is changed in step S708. If there is no instruction to change authentication password (NO in step S707), the processing terminates without anything done.

Figure 20:
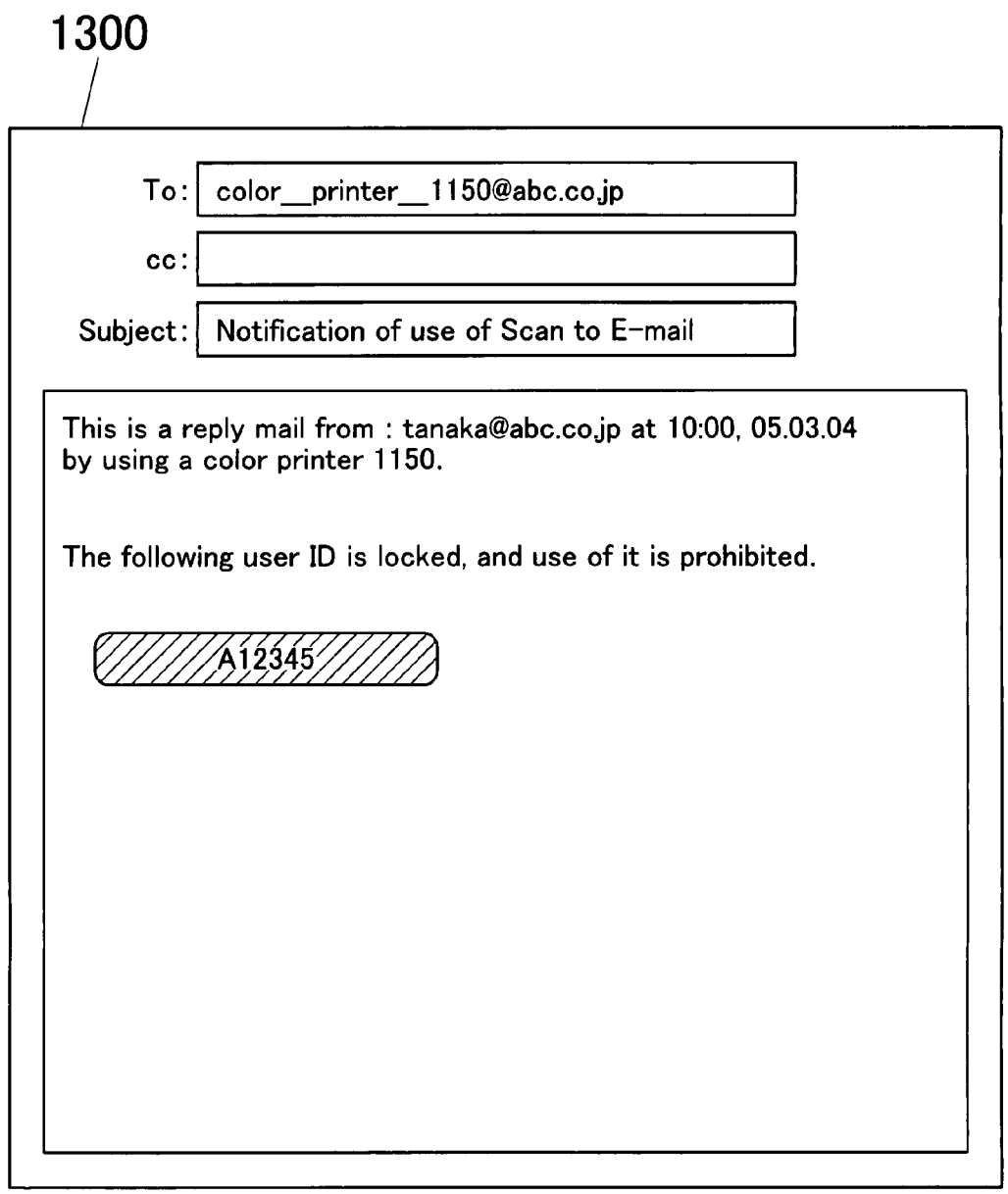
FIG. 20 is a chart showing an example of the return mail containing an instruction to lock user ID that is received by the Job executing device.

FIG. 20 is a chart showing an example of the return mail including an instruction to lock user ID received in the Job executing device 100.

Displayed in the return mail 1300 are a message indicating that it is a return mail from a user and the specific user ID's of prohibited use.

Figure 21:
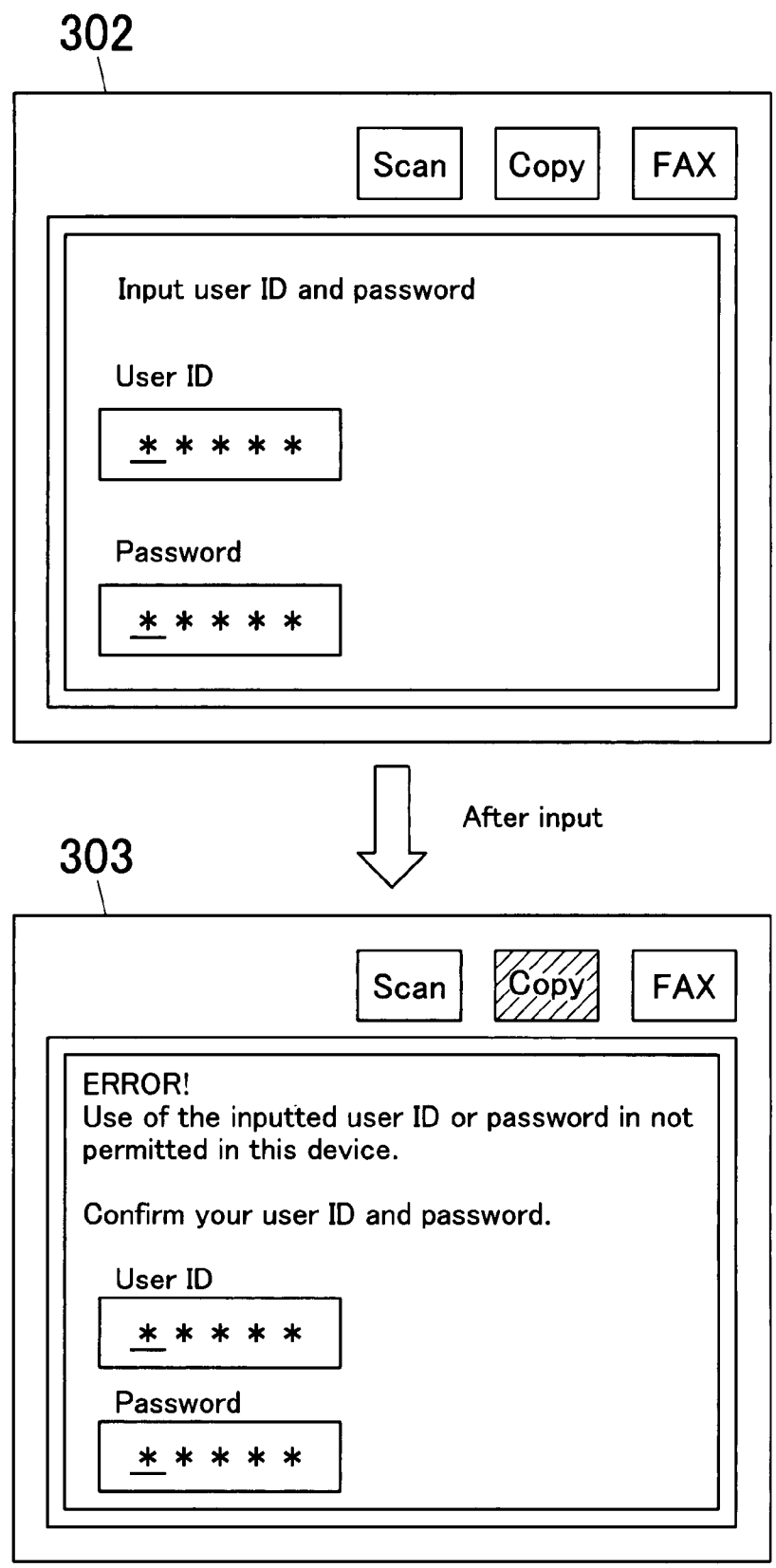
FIG. 21 is a chart showing a screen for inputting verification information that is displayed on the operation display unit after the user ID is locked or the password is changed.

FIG. 21 is a chart showing a screen for inputting verification information displayed on the operation display unit 202 after the user ID is locked or the password is changed.

When a user ID and an old password are inputted in the input screen 302 of FIG. 21, a screen 303 indicating that authentication is failed is displayed. The screen 303 displays a messages, for example, like "Use of the inputted user ID and password is not permitted in this device. Make sure to confirm the user ID and the password".

If there is an instruction prohibiting use of a user ID or a request for changing a password included in the return mail as described above, the Job executing device 100 locks the user ID or changes the password, prohibiting continuous unauthorized use by an unauthorized user reliably.

Figure 22:
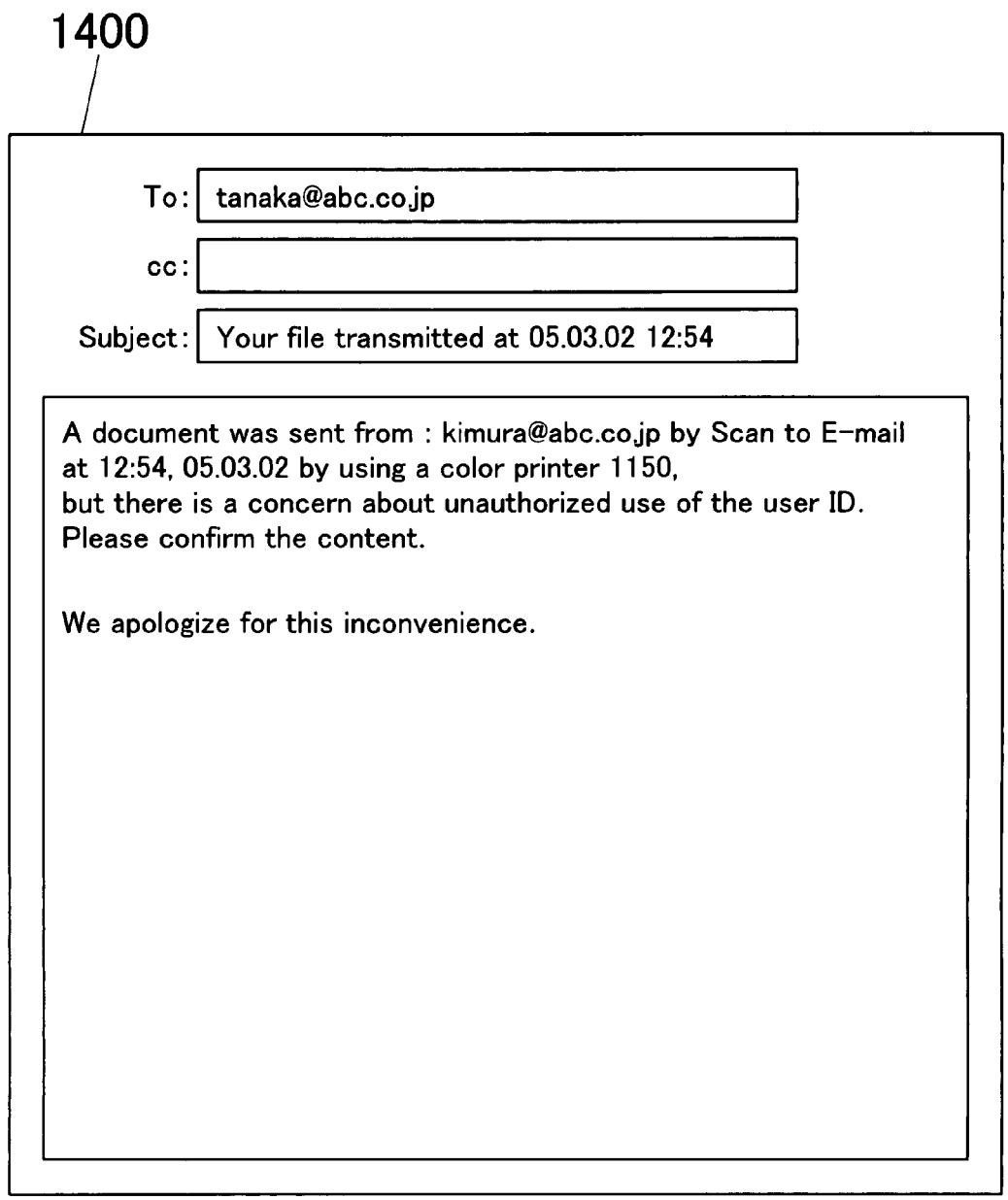
FIG. 22 is a chart showing an example of the apologetic mail sent to the transmission address of image data.

FIG. 22 is a chart showing an example of the apologetic mail sent to the transmission address of image data in step S707 of FIG. 19. The mail 1400 includes a message informing the address of transmission destination user that the Scan to E-mail function is used in an unauthorized way and an apologetic message.

Figure 23:
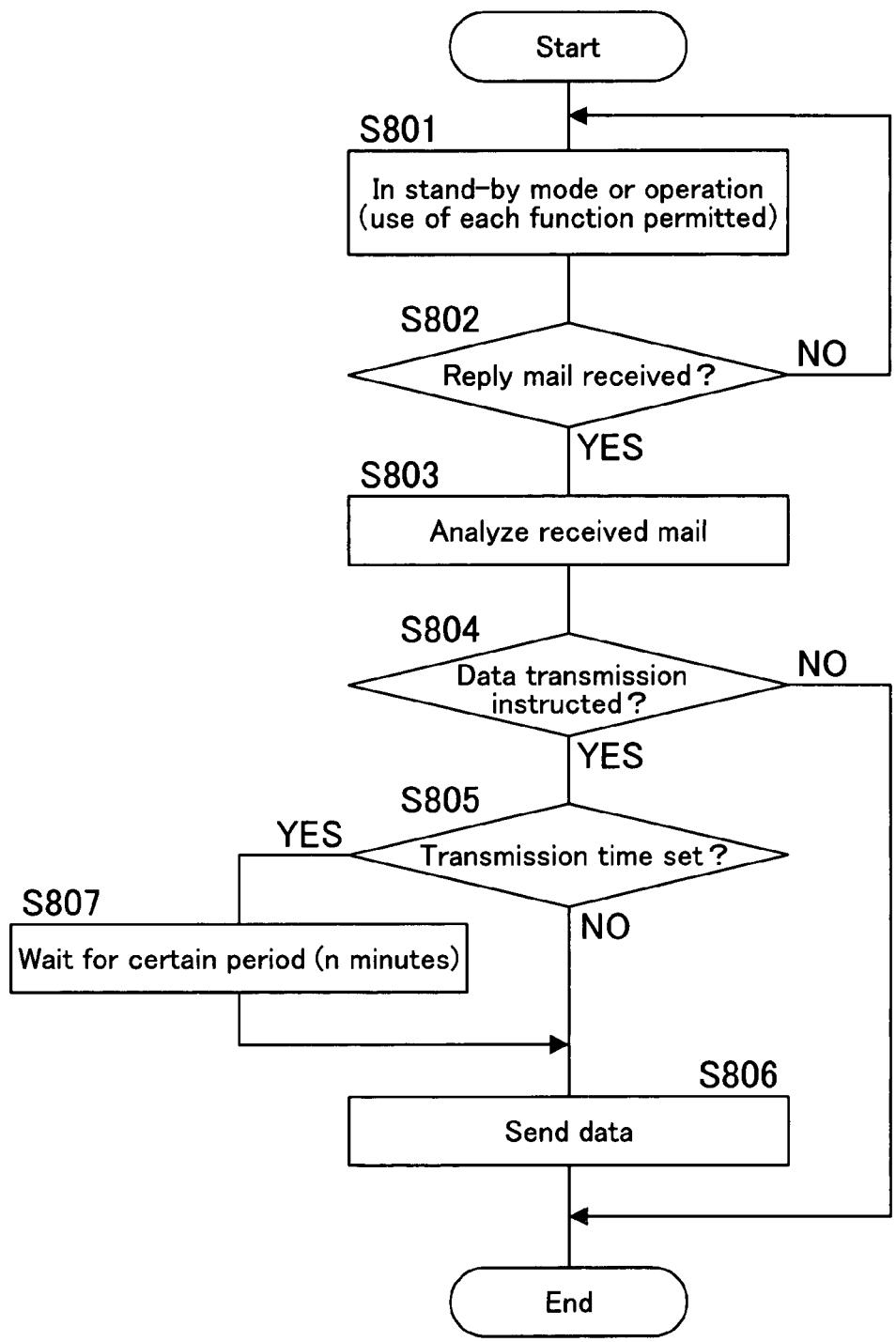
FIG. 23 is a flowchart in yet another embodiment of the present invention showing the processing for transmitting image data to a transmission destination when transmission of the image data is permitted by a return mail to the notification mail sent to a user registered address.

FIG. 23 is a flowchart showing yet another embodiment of the present invention. In the present embodiment, the image data is transmitted to the transmission destination when transmission of the image data is permitted by a return mail to the notification mail transmitted to the user's registered address.

In this example, the user logging in to the Job executing device 100 selects the Scan to E-mail function, designates a destination, and then, makes the image-reading unit 205 read a manuscript. The Job executing device 100 generates image data of the read manuscript and stores it in the device as it is, without sending it to the destination.

In step S801 of FIG. 23, CPU 701 examines whether the log-in user with permitted access is in the stand-by mode or in operation and waits for receipt of the return mail form the notification destination in step S802.

Upon receipt of the return mail (YES in step S802), UPU 701 analyzes the content in the received mail in step S803, and judges whether there is an instruction to transmit the image data included in the return mail in step S804.

If there is no instruction to transmit the image data (NO in step S804), the processing terminates then. If there is an instruction to transmit the image data (YES in step S804), in step S805, it is judged whether the transmission-period setting is specified.

If there is no specified transmission-period setting (NO in step S805), in step S806, the image data is transmitted to the transmission destination. If there is a transmission-period setting (YES in step S805), CPU 701 waits for a certain period (n minutes) and transmits the image data to the transmission destination after a specific transmission time in step S806.

Because the image data is transmitted when a return mail from the notification destination contains an instruction to transmit the image data as described above, the authorized user at the notification destination can realized whether the instruction to transmit the image data is given by itself or by an unauthorized user, before transmission of the image data; and, because the transmission is not executed without permission by an authorized user, it is possible to prevent actual transmission of the image data by execution instruction by an unauthorized user.

Figure 24:
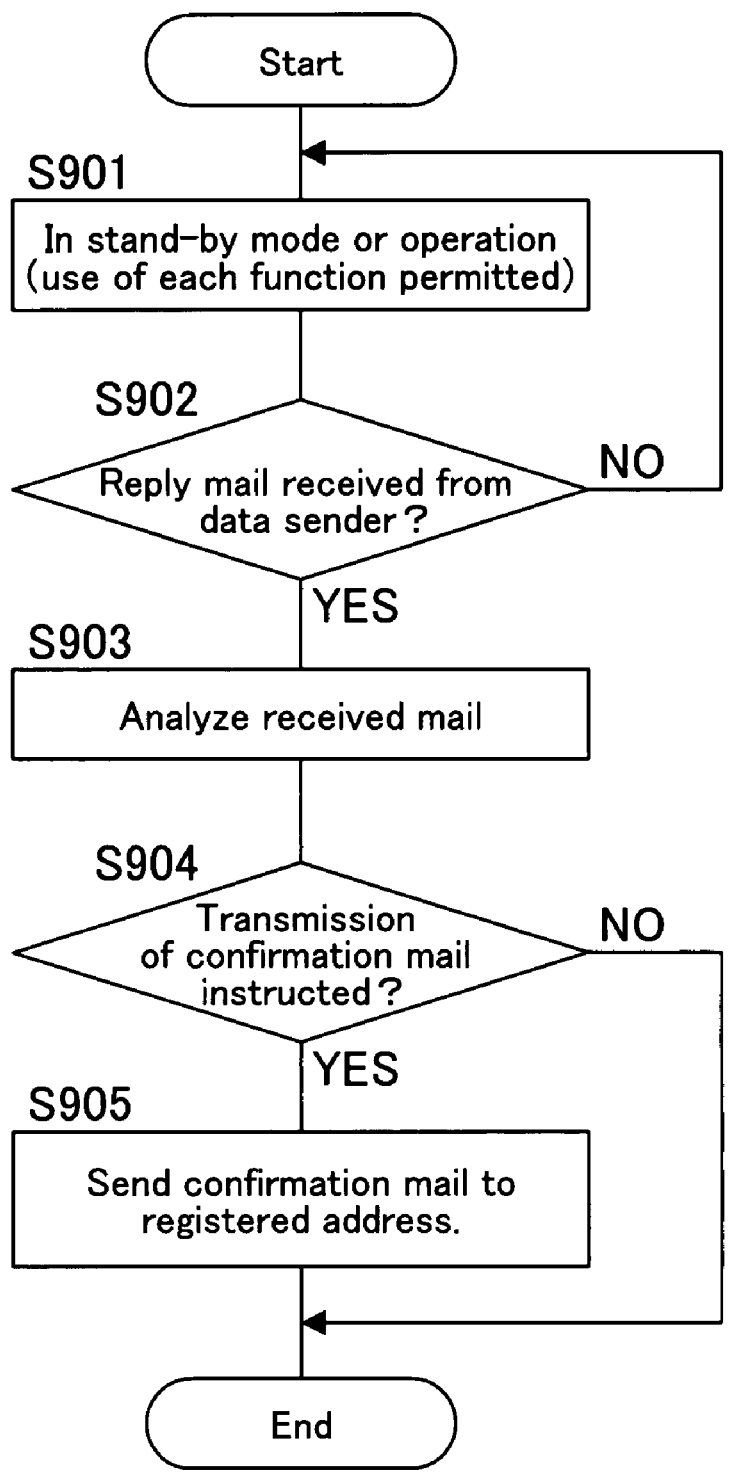
FIG. 24 is a flowchart in yet another embodiment of the present invention, showing the processing for transmitting a notification mail when there is an instruction or request from the transmission address of image data for transmitting a confirmation mail to the notification destination.

FIG. 24 is a chart showing yet another embodiment of the present invention. In the present embodiment, a notification mail is transmitted when an instruction or request to transmit a confirmation mail to the notification destination is delivered from the transmission address of image data.

In this example, the user logged in to the Job executing device 100 selects the Scan to E-mail function and designates the destination, and then makes the image-reading unit 205 read a manuscript. The Job executing device 100 generates image data of the read manuscript and transmits it to the destination.

In step S901 of FIG. 24, CPU 701 examines whether the log-in user with permitted access is in the stand-by mode or in operation and waits for receipt of the return mail form the notification destination in step S902.

Upon receipt of the return mail (YES in step S902), the content in the received mail is analyzed in step S903, and it is judged whether there is an instruction to transmit a confirmation mail included in the return mail in step S904.

If there is no instruction to transmit a confirmation mail included (NO in step S904), the processing terminates then. If there is an instruction to transmit a confirmation mail (YES in step S904), in step S905, the confirmation mail is transmitted to the user's registered address, and the transmission of the image data is notified.

Figure 25:
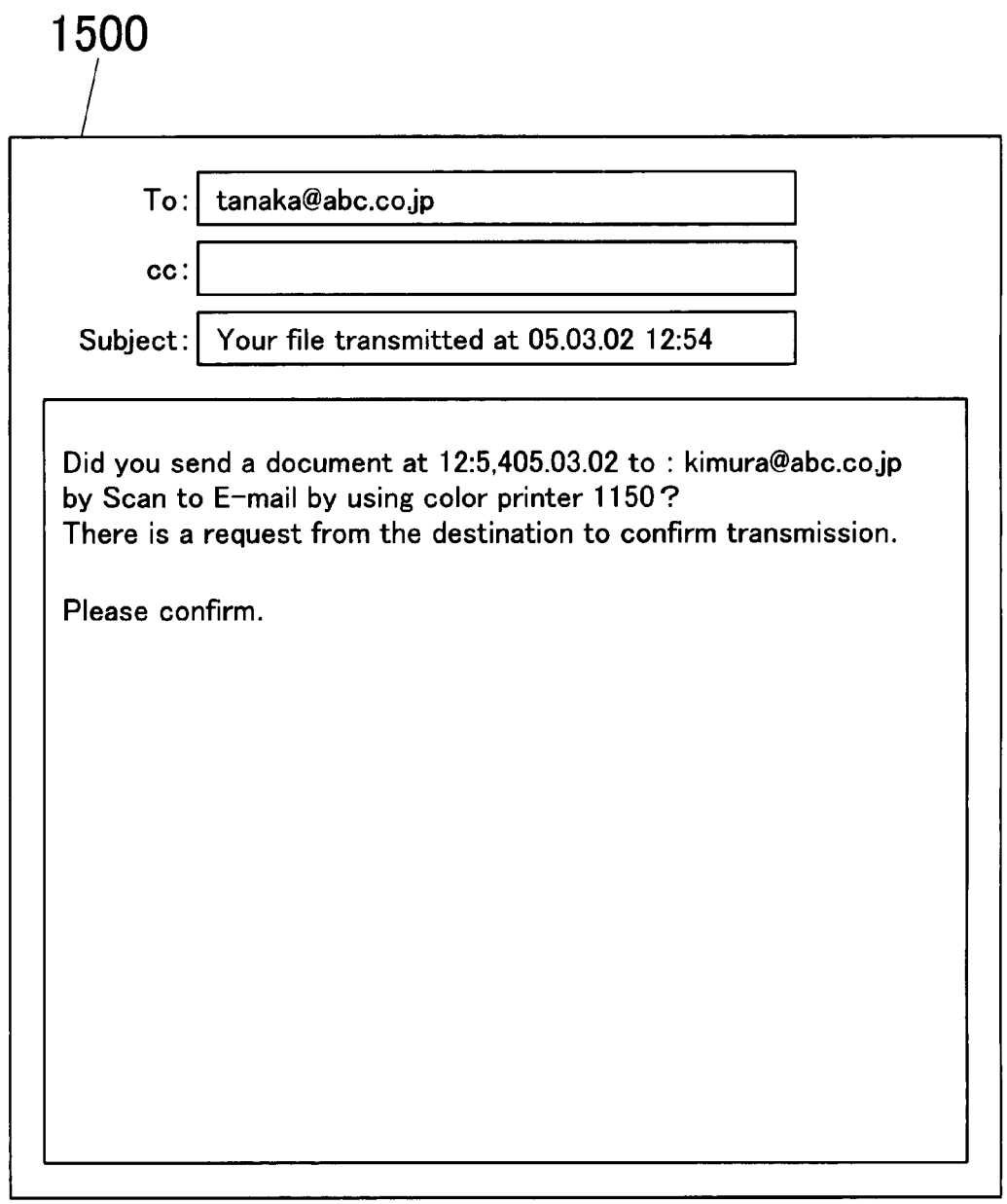
FIG. 25 is a chart showing an example of the confirmation mail.

FIG. 25 is a chart showing an example of the confirmation mail. Displayed in the confirmation mail 1500 is a message indicating that transmission of image data to the transmission destination by the Scan to E-mail function should be confirmed.

In the embodiment, a transmitter who has a concern about transmission of the image data to itself can send back a request for confirmation mail to the Job executing device 100; the Job executing device 100 that received the return mail notifies the users' registered addresses of the fact; and thus, the authorized user can realize the fact of unauthorized use, if present.

Figure 26:
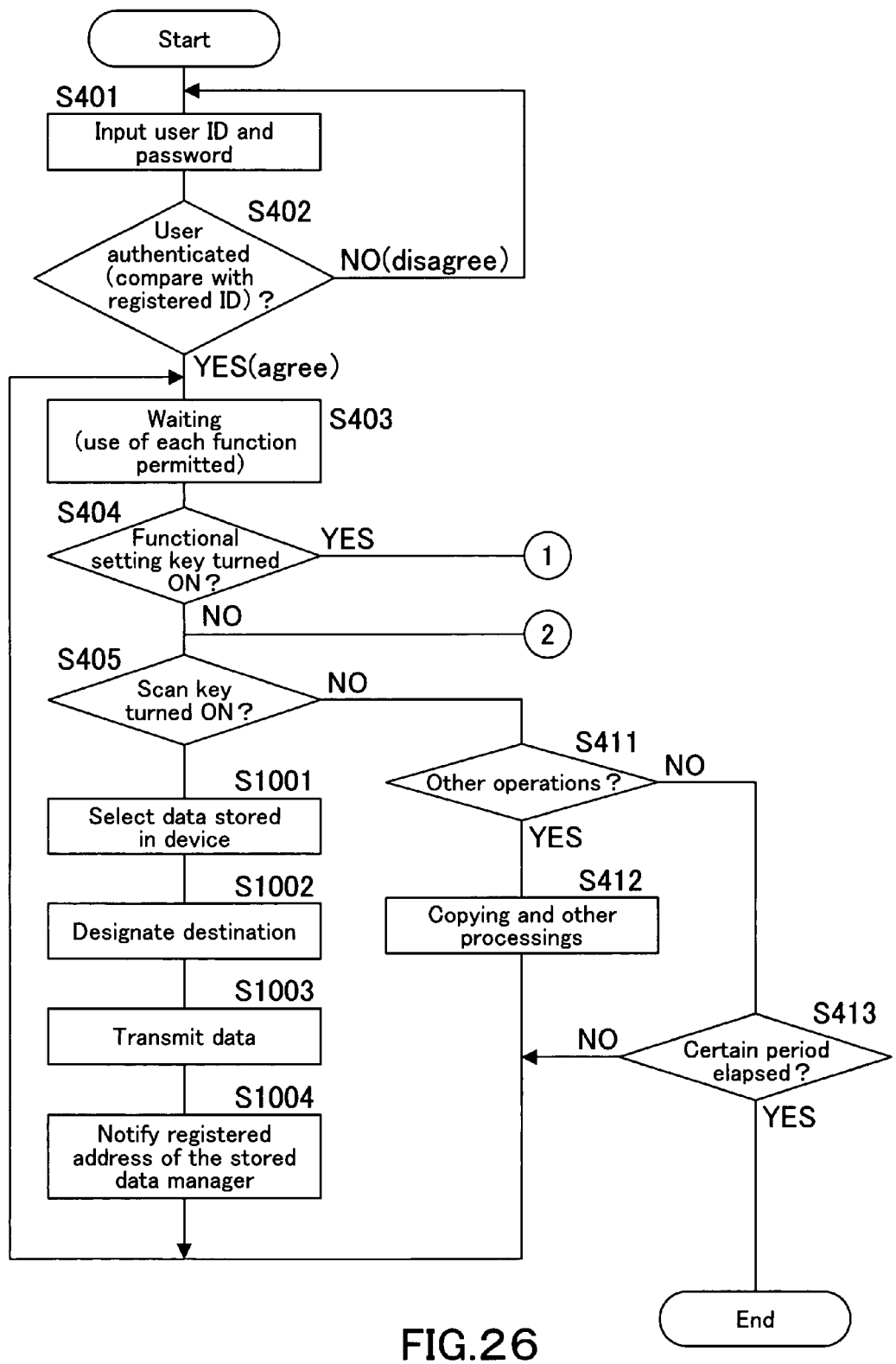
FIG. 26 is a flowchart in yet another embodiment of the present invention showing the processing for notifying the registered address of data manager that the data is transmitted when the image data stored in the Job executing device is transmitted.

FIG. 26 is a flowchart showing yet another embodiment of the present invention. In the present embodiment, when the image data stored in the Job executing device 100 is transmitted by the E-mail function, the fact that the data is transmitted is notified to the registered address of data manager.

In the processing shown in FIG. 26, steps up to step S405 of judging whether the scan key is turned on are the same as those in the flowchart shown in FIG. 4 flowchart; the same step numbers were allocated as in FIG. 4; and the detailed description thereof is omitted.

When the scan key is turned on (YES in step S405), the image data stored in the data memory unit 208 of Job executing device 100 is selected in step S1001; the transmission destination is designated in step S1002; and the image data is transmitted to the transmission address via the communication unit 209 in step S1003.

Then in step S1004, the fact that the image data is transmitted is informed to the notification destination of the manager user of the stored data, and the processing goes back to step S403.

The notification may be sent to the registered address of the authorized user, in addition to the image-data manager.

Favorable embodiments of the present invention are described so far, but the present invention is not limited to the embodiments above. Although the case where the job to be notified to the notification destinations, such as registered addresses of authorized user and manager, is a job of transmitting the image data is described, the notification may be sent, when use of the other job, for example copy job by using the copying-machine function, is instructed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrate herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present invention. The limitation in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "not well."

What is claimed is:

1. A job executing device, comprising:
    an image-reading unit of reading an image of a physical document;
    a job executing unit of executing a job concerning image data;
    an execution instruction-receiving unit of receiving an instruction for job execution sent to the job executing unit by a user authenticated by an authentication unit;
    a memory unit of storing a notification destination corresponding to user identification information inputted for user authentication; and
    a notification unit of transmitting an electronic mail message, after the job is executed according to the received instruction for job execution, to the notification destination corresponding to the inputted user identification information;
    wherein the electronic mail message displays a notification that the job has been executed and includes a button to send reply information to the job executing device indicating that the inputted user identification information cannot be used for user authentication so that a user seeking to execute a future job, after the job is executed, cannot use the inputted user identification information to instruct execution of the future job.

2. The job executing device according to claim 1, wherein the indication that the inputted user identification cannot be used for user authentication is accepted when the reply information is received from the notification destination.

3. The job executing device according to claim 1, wherein a request to change the password for the authentication is accepted based on the reply information when the reply information to the electronic mail message by the notification unit is received from the notification destination.

4. The job executing device according to claim 1, further comprising a setting unit of setting whether the electronic mail message is delivered by the notification unit.

5. The job executing device according to claim 1, further comprising a setting unit of setting the number or frequency of the jobs executed, for delivering the electronic mail message from the notification unit after a particular number or at a particular frequency of jobs executed.

6. The job executing device according to claim 1, wherein the notification unit sends the electronic mail message with an attached past job execution history to the notification destination.

7. The job executing device according to claim 1, wherein further comprising a designation unit of designating that the image data is confidential data, wherein the notification unit sends the electronic mail message only when the image data is designated as confidential data.

8. The job executing device according to claim 1, wherein the job executed by the job executing unit is a job of transmitting the image data.

9. The job executing device according to claim 8, wherein the notification unit prohibits the electronic mail message when a transmission address for transmitting the image data agrees with the notification destination.

10. The job executing device according to claim 1, further comprising a setting unit of setting a notification level, wherein the notification unit changes execution of the electronic mail message according to the notification level set therein.

11. The job executing device according to claim 1, wherein the job executed by the job executing unit is a job of transmitting the image data, and apologetic data is transmitted to the transmission address to which the image data is already transmitted when use of the user identification information is prohibited.

12. The job executing device according to claim 1, the job executed by the job executing unit is a job of transmitting the image data, and the notification unit notifies the notification destination when the communication unit receives reply information from the transmission address of the image data.

13. The job executing device according to claim 1, wherein the job executed by the job executing unit is a job of transmitting the image data stored in the device, and the notification destination is the notification destination of a manager user managing the stored data.

14. A job executing and processing method, comprising:
- a step of reading an image of a physical document;
- a step of receiving an instruction for job execution sent by a user authenticated by an authentication unit;
- a step of executing a job concerning image data; and
- a step of an electronic mail message, after the job is executed according to the received instruction for job execution, to the notification destination corresponding to the user authenticated at the authentication unit;
- wherein the electronic mail message displays a notification that the job has been executed and includes a button to send reply information indicating that the authentication unit is prohibited from authenticating the user so that the user is prevented from executing a future job after the job is executed.

15. A job executing and processing program stored on a nontransitory computer readable medium to make a computer execute the steps comprising:
- reading an image of a physical document;
- receiving an instruction for job execution sent by a user authenticated by an authentication unit;
- executing a job concerning image data; and
- transmitting an electronic mail message, after the job is executed according to the received instruction for job execution, to the notification destination corresponding to the user authenticated at the authentication unit;
- wherein the electronic mail message displays a notification that the job has been executed and a button to send reply information indicating that the authentication unit is prohibited from authenticating the user so that the user is prevented from executing a future job after the job is executed.

* * * * *